(12) United States Patent
Shibutani et al.

(10) Patent No.: US 7,915,341 B2
(45) Date of Patent: Mar. 29, 2011

(54) ETHYLENE-VINYL ALCOHOL COPOLYMER AND MOLDED ARTICLE THEREOF

(75) Inventors: Mitsuo Shibutani, Osaka (JP); Takamasa Moriyama, Osaka (JP); Kaoru Inoue, Osaka (JP); Shinta Miyazumi, Okayama (JP); Ikko Matsui, Okayama (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 1115 days.

(21) Appl. No.: 11/629,051

(22) PCT Filed: Dec. 17, 2004

(86) PCT No.: PCT/JP2004/018903
§ 371 (c)(1),
(2), (4) Date: Dec. 8, 2006

(87) PCT Pub. No.: WO2005/121194
PCT Pub. Date: Dec. 22, 2005

(65) Prior Publication Data
US 2007/0178268 A1 Aug. 2, 2007

(30) Foreign Application Priority Data

Jun. 10, 2004 (JP) .................. 2004-172193
Sep. 10, 2004 (JP) .................. 2004-263170
Sep. 28, 2004 (JP) .................. 2004-282131
Sep. 28, 2004 (JP) .................. 2004-282134
Sep. 28, 2004 (JP) .................. 2004-282135

(51) Int. Cl.
*C08F 16/06* (2006.01)
(52) U.S. Cl. ........ 525/60; 428/34.1; 428/35.7; 428/480; 428/483; 524/405; 525/56; 525/58; 525/62; 526/330
(58) Field of Classification Search .................. 428/34.1, 428/35.7, 480, 483; 524/405; 525/56, 58, 525/60, 62; 526/330
See application file for complete search history.

(56) References Cited

U.S. PATENT DOCUMENTS

| | | | | |
|---|---|---|---|---|
| 2,518,440 | A * | 8/1950 | Joyce, Jr. .................. | 525/327.2 |
| 6,090,900 | A | 7/2000 | Turner et al. | |
| 6,348,623 | B2 | 2/2002 | Webster et al. | |
| 6,472,491 | B1 * | 10/2002 | Martinez et al. ........... | 526/348.8 |
| 2004/0186232 | A1 * | 9/2004 | Shibutani ....................... | 525/61 |

FOREIGN PATENT DOCUMENTS

| | | | |
|---|---|---|---|
| EP | 1 195 392 | A2 | 4/2002 |
| EP | 1 195 393 | A | 4/2002 |
| JP | 03-005143 | | 1/1991 |
| JP | 1996-319318 | | 12/1996 |
| JP | 9-48824 | | 2/1997 |
| JP | 1999-035772 | | 2/1999 |
| JP | 2000-129276 | | 5/2000 |
| JP | 2002-241433 | | 8/2002 |
| JP | 2002-284811 | | 10/2002 |
| JP | 2003-171522 | A | 6/2003 |
| JP | 2004-075866 | | 3/2004 |
| JP | 200475866 | * | 3/2004 |
| JP | 2004-285143 | A | 10/2004 |
| WO | WO 2004/106470 | A1 | 12/2004 |

OTHER PUBLICATIONS

Japanese Official Action mailed Apr. 10, 2008, for Application No. 263170/2004.
Supplementary European Search Report dated Jan. 21, 2008; Application No. EP 04 80 7261.
International Search Report mailed Feb. 15, 2005 in International Application No. PCT/JP2004/018903.
Japanese Official Action mailed Apr. 20, 2010, for Application No. 2005-281242.
Japanese Official Action issued Oct. 5, 2010 for Application No. 2005-280426 and English translation of the Office Action.

* cited by examiner

*Primary Examiner* — David Wu
*Assistant Examiner* — Marie Reddick
(74) *Attorney, Agent, or Firm* — Antonelli, Terry, Stout & Kraus, LLP.

(57) ABSTRACT

An ethylene-vinyl alcohol copolymer and a molded article thereof are disclosed. The ethylene-vinyl alcohol copolymer has improved stretching properties and provides the molded article with excellent gas barrier properties, appearance and strength. The ethylene-vinyl alcohol copolymer comprises the structural unit of formula (1):

$$—[CH_2—C(R^1)]— \atop \underset{\underset{R^4}{|}}{\overset{\overset{(X)_n}{|}}{|}} \atop HO—C—R^2 \atop | \atop HO—C—R^3 \quad (1)$$

(wherein X represents any binding chain excluding an ether bond, each of $R^1$ to $R^4$ represents independently any substituent and n represents 0 or 1.).

14 Claims, 2 Drawing Sheets

ETHYLENE-VINYL ALCOHOL COPOLYMER AND MOLDED ARTICLE THEREOF

RELATED APPLICATION

This application is a U.S. national phase application filed under 35 U.S.C. §371 of International Application No. PCT/JP2004/018903 filed Dec. 17, 2004, and claiming priority of Japanese Patent Application Nos. 2004-172193 filed Jun. 10, 2004; 2004-263170 filed Sep. 10, 2004; 2004-282131 filed Sep. 28, 2004; 2004-282134 filed Sep. 28, 2004; and 2004-282135 filed Sep. 28, 2004.

TECHNICAL FIELD

The present invention relates to a new ethylene-vinyl alcohol copolymer and a molded article thereof and more specifically related to a new ethylene-vinyl alcohol copolymer, which has improved stretching properties and provides a molded article having excellent gas barrier properties, appearance and strength, and a molded article thereof.

BACKGROUND ART

In general, an ethylene-vinyl alcohol copolymer (hereinafter, referred to as EVOH) is excellent in transparency, gas barrier properties, aroma retention, solvent resistance, oil resistance and the like and has been used for various packaging materials such as a food packaging material, a pharmaceutical packaging material, an industrial chemical packaging material and a agricultural chemical pack aging material making the most use of such properties. The EVOH often subjected to thermal stretching treatment for the purposes of deformation to a container for practical use and the improvement of mechanical strength and the like. Further, in recent years, when molding a container from a multi-layer sheet containing EVOH, a container with a deep bottom has been also prepared from the viewpoints of the variety of container shape and design properties and EVOH having excellent moldability, so that the appearance, barrier properties and strength of the container after molding are favorable, is desired for molding such deep containers.

However, EVOH is inferior to polypropylene and polystyrene in thermal stretching properties and as measures therefor, (1) the method of adding a plasticizer to EVOH (for example, see JP-A-53-88067 and JP-A-59-20345) and (2) the method of mixing polyamide resin EVOH (for example, see JP-A-52-141785 and JP-A-58-36412) have been suggested. Also, on the other hand, there are also suggested (3) the method of using a resin composition wherein EVOH having a low glass transition temperature, which has relatively favorable stretching properties, is used together (for example, see JP-A-61-4752, JP-A-60-173038, JP-A-63-196645, JP-A-63-230757, JP-A-63-264656 and JP-A-2-261847) and (4) the method of mixing 3 types of EVOH (for example, see JP-A-2001-31821 and JP-A-2001-31823). Furthermore, studies have been conducted regarding (5) adding an ethylene-(meth) acrylic acid copolymer to EVOH to improve the thermal stretching properties thereof at low temperatures (for example, see JP-A-11-99594) and (6) grafting an epoxy compound to EVOH by a melting reaction to improve thermal moldability for forming a container and stretching properties (for example, see WO 02/092643 and JP-A-2003-327619).

However, when the present inventors studied the above methods in detail, it was found that in method (1), the gas barrier properties decreased and in method (2), long run melt moldability decreased. In method (3), the improvement of thermal stretching moldability is confirmed to a certain degree, but because EVOH of different composition and structure are mixed, the compatibility is not completely homogeneous. Also, EVOH tends to be influenced by fluctuation of extrusion conditions and thermal stretching molding conditions and defective articles are inevitably produced in the case that films, cups, trays and bottles are continuously molded by stretching. In method (4), continuous moldability is improved but defective articles are inevitably produced in the case that a container having a large drawing ratio, which requires high stretching properties, is formed. In method (5), moldability in relatively low temperatures is improved but long run melt moldability may decrease. Also, it was found that the appearance, barrier properties and strength of a deep container having a drawing ratio of at least 2.5 were not at all studied. In method (6), because EVOH and an epoxy compound are reacted in a melted condition, miscellaneous side reaction products are inevitably produced and decrease in long run melt moldability and problems of safety and sanitation may occur. Furthermore, it was found that the appearance, barrier properties and strength of a deep container having a drawing ratio of at least 2.5 were not at all studied. In this way, EVOH having excellent moldability, so that the appearance, barrier properties and strength of the container after molding are favorable even when a deep container is formed, is desired.

Also, besides those described above, EVOH has the following problems depending on the use.

For example, EVOH is used for multi-layer containers prepared by laminating polyester resin (mainly polyethylene terephthalate, hereinafter referred to as PET) on both faces of an EVOH layer in order to improve properties such as humidity resistance of the container, barrier properties of carbon dioxide and aromatic components and mechanical properties. Recently, such multi-layer containers are attracting attention as pressure resistant bottles for carbonated soft drinks and alcoholic drinks.

PET has excellent transparency and stiffness, moderate gas barrier properties and aroma retaining properties and is widely used in containers for carbonated drinks and soft drinks. However, the gas barrier properties thereof are insufficient for uses that require high gas barrier properties, such as containers for beer and wine, and as described above, PET can be used as an excellent gas barrier container by laminating with an EVOH layer. However, usually, a thermoplastic polyester resin such as PET and EVOH are poor in adhesion and in order to increase interlayer peeling strength and interlayer peeling resistance, a specific adhesive resin must be between the layers.

However, recently, PET is recycled and reused and in the case that an adhesive resin is present between the layers, separation of PET and EVOH becomes difficult. As a result, there is the problem that the recycled PET deteriorates in quality and therefore has difficulty being accepted in the market.

A multi-layer container wherein polyester resin (PET) is laminated on both sides of the EVOH layer without using an adhesive resin is suggested (for example, see JP-A-61-173924). However, because an adhesive resin is not used, interlayer separation may occur between the EVOH layer and the PET layer while using as a container. As measures therefor, there are suggested (7) the method of mixing several kinds of EVOH (for example, see JP-A-11-348196, JP-A-2001-236919, JP-A-2002-210888 and JP-A-2002-210889), (8) the method of using EVOH of a low hydrolysis degree (for example, see JP-A-11-348197) and (9) the method of mixing other resin (for example, see JP-A-11-79156, JP-A-2002-

210887 and JP-A-2002-210890). Also, (10) the method of grafting an epoxy compound to EVOH by a melting reaction to improve thermal moldability for forming a container and stretching properties (for example, see JP-A-2003-320600) is suggested.

However, although interlayer impact peeling resistance is improved by each of the above methods, in method (7), the different kinds of EVOH are not completely compatible and transparency decreases and pressure resistant strength tends to decrease, as stretching is uneven. In method (8), decrease of barrier properties may occur and in method (9), decrease of transparency may occur. In method (10), transparency of the body is improved but because an EVOH composition obtained by reacting EVOH and an epoxy compound in a melted state is used as the middle layer, miscellaneous side reaction products are inevitably produced and decrease in long run melt moldability and problems of safety and sanitation may occur. Also, the transparency of the bottom and neck of a bottle wherein the layer of EVOH becomes thick is not at all considered. Furthermore, in recent years, there is a tendency to reduce the amount of resin used in bottles from the viewpoint of resource saving and a bottle having favorable pressure resistance and small difference in pressure resistance strength, as all bottles cannot be tested for pressure resistance, is desired. Studies up to present have not considered pressure resistance or difference in pressure resistance strength. Desired is a bottle having favorable barrier properties, interlayer impact peeling resistance and transparency of the bottom and neck, high pressure resistance and small difference in pressure resistance strength.

EVOH is used for various packaging materials by laminating film of low-density polyethylene, polypropylene, nylon or polyester on both sides of EVOH, to maintain properties of EVOH such as gas barrier properties, aroma retaining properties and anti-discoloring properties of foods and compensating shortcomings of EVOH such as falling strength, thermal moldability and moisture resistance. Moreover, recently, in addition to packaging for food as described above, EVOH is used for containers such as bottles, tanks and drums for transporting and storing fuel having hydrocarbon as the main component.

However, in such uses, further improvement of fuel barrier properties is desired. For example, it is suggested that (11) a fuel container having EVOH as the middle layer, in which the outer layer thickness is larger than the inner layer thickness (for example, see JP-A-9-29904), and (12) a fuel container having as the middle layer EVOH containing a small amount of ethylene and having a specific metal salt (for example, see JP-A-2001-341535).

In recent years, due to tightening regulation regarding environmental pollution, high fuel barrier properties are necessary under the conditions of long term use and stability of the quality of the canister is strongly desired. However, in the methods of (11) and (12), fuel barrier properties may decrease after subjecting to heat shock and also, before heat shock, fuel barrier properties differ in each fuel container.

Utilizing its properties, EVOH is molded into films, sheets, tubes, cups, trays and bottles for packaging materials for food, pharmaceutical products, industrial chemicals and agricultural chemicals. Particularly, because most fatty foods such as meat and processed foods thereof are irregular in shape and size, EVOH is often used as shrink packaging in order to improve fresh storage and appearance of the contents. Therefore, a multi-layer shrink film which is excellent in thermal shrinking properties and gas barrier properties is desired. In order to improve such properties, it is suggested that (13) the method of mixing two kinds of EVOH having a different composition (for example, see JP-A-5-200865 and JP-A-2000-211068), (14) the method of mixing another resin in EVOH (for example, see JP-A-5-77352, JP-A-5-228996, JP-A-7-1685, JP-A-8-81610, JP-A-8-81570 and JP-A-2000-246843) and (15) the method of mixing a plasticizer with EVOH (for example, see JP-A-5-261815 and JP-A-5-200865).

However, in a multi-layer shrink film obtained by method (13), thermal shrinking properties and gas barrier properties are excellent, but because two kinds of EVOH having a different composition are mixed, compatibility is insufficient and areas of decreased transparency develop in some areas after thermal shrinkage. Also, because adhesion between the adhesive resin layer which adheres the EVOH layer and the thermoplastic resin layer and the EVOH layer decreases, there is the problem that interlayer separation (delamination) occurs in the multi-layer film after shrinking. In a multi-layer shrink film obtained by method (14), because a different resin is mixed, adhesion decreases and there is the problem that interlayer separation (delamination) occurs in the multi-layer film after shrinking. In a multi-layer shrink film obtained by method (15), the problems of decrease in barrier properties and delamination occur. Thus, a multi-layer shrink film that is excellent in stretching properties, thermal shrinking properties, gas barrier properties, transparency after thermal shrinkage and delamination resistance is desired.

The present invention aims to provide a new ethylene-vinyl alcohol copolymer, which has improved stretching properties and provides a molded article having excellent gas barrier properties, appearance and strength, and a molded article thereof.

DISCLOSURE OF INVENTION

The present invention relates to an ethylene-vinyl alcohol copolymer comprising the structural unit of formula (1):

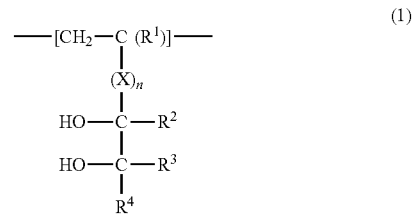

(wherein X represents any binding chain excluding an ether bond, each of $R^1$ to $R^4$ represents independently any substituent and n represents 0 or 1.).

Each of $R^1$ to $R^4$ is preferably independently either of a hydrogen atom, a hydrocarbon group having 1 to 8 carbon atoms, a cyclic hydrocarbon group having 3 to 8 carbon atoms or an aromatic hydrocarbon group in the structural unit of formula (1).

Either of $R^1$ to $R^4$ is preferably a hydrogen atom in the structural unit of formula (1).

X is preferably an alkylene group having at most 6 carbon atoms in the structural unit of formula (1).

In the structural unit of formula (1), n is preferably 0.

The ethylene content is preferably 10 to 60% by mol.

The amount of the structural unit of formula (1) is preferably 0.1 to 30% by mol.

The ethylene-vinyl alcohol copolymer is preferably obtained by hydrolyzing a copolymer obtained by copolymerization of 3,4-diacyloxy-1-butene, a vinyl ester monomer and ethylene.

3,4-Diacyloxy-1-butene is preferably 3,4-diacetoxy-1-butene.

0.001 to 0.1 part by weight of a boron compound, converted to boron, is preferably contained based on 100 parts by weight of the ethylene-vinyl alcohol copolymer.

The present invention relates to a molded article comprising the ethylene-vinyl alcohol copolymer.

The molded article is preferably obtained by melt-molding.

The present invention relates to a film and a container comprising the ethylene-vinyl alcohol copolymer.

The present invention relates to a biaxially stretch blow bottle comprising an intermediary layer comprising the ethylene-vinyl alcohol copolymer and both outer layers comprising a thermoplastic polyester resin.

The present invention relates to a fuel container comprising the ethylene-vinyl alcohol copolymer.

The present invention relates to a multi-layer shrink film comprising a layer comprising the ethylene-vinyl alcohol copolymer and a layer containing thermoplastic resin, which is laminated on one side or both sides on the layer.

Further, the present invention relates to a process for preparing the ethylene-vinyl alcohol copolymer, which comprises the step of preparing a copolymer by copolymerizing 3,4-diacyloxy-1-butene, a vinyl ester monomer and ethylene and a step of hydrolyzing said copolymer.

BEST MODE FOR CARRYING OUT THE INVENTION

Figure 1:
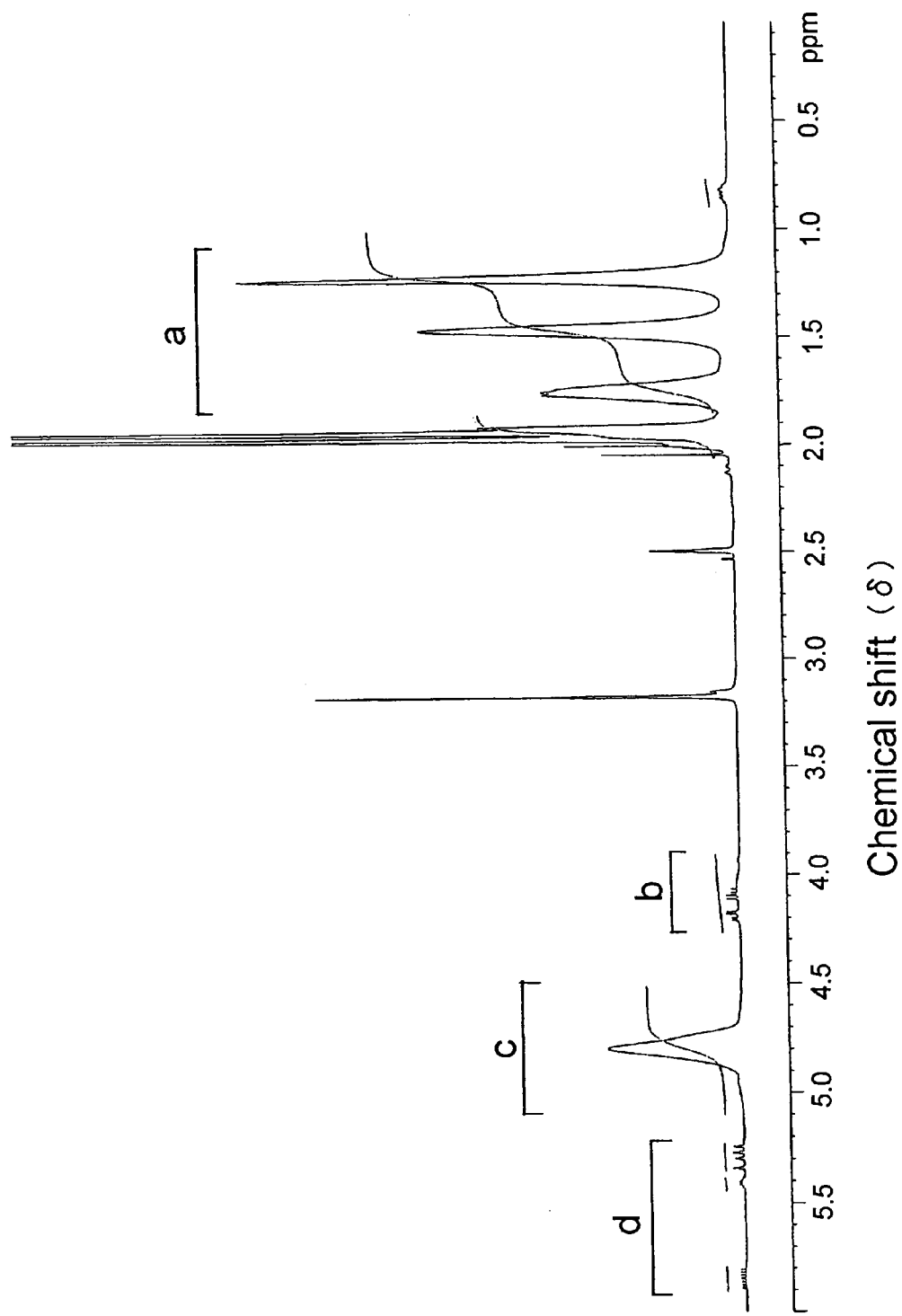
FIG. 1 is a $^1$H-NMR chart of EVOH obtained in Example 1 before hydrolysis.

The EVOH of the present invention is characterized in containing the structural unit of formula (1) that is a structural unit containing a 1,2-glycol bond. As the binding chain (X) that bonds the EVOH main chain and the 1,2-glycol binding structure, any binding chain extruding an ether bond can be applied and is not particularly limited.

Examples are hydrocarbons such as alkylene, alkenylene, alkinylene, phenylene and naphthalene (these hydrocarbons can be substituted with halogens such as fluorine, chlorine and bromine), —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$O—, —OTi(OR)$_2$—, —Al(OR)—, —OAl(OR)— and —OAl(OR)O— (each R is independently any substituent, preferably a hydrogen atom or an alkyl group, m is a whole number). Of these, from the viewpoint of the thermal melt stability, alkylene is preferable as the bond and alkylene having at most 6 carbon atoms is more preferable. From the viewpoint that gas barrier performance of EVOH becomes favorable, the number of carbon atoms is preferably smaller and a 1,2-glycol bond structure, wherein n is 0, is directly bonded to the molecular chain is most preferable. When the binding chain (X) is an ether bond, the bond is unstable when melt molding, thus being unpreferable from the viewpoint that thermal melt stability of EVOH decreases. Further, R$^1$ to R$^4$ can be any substituent and are not particularly limited, but each of R$^1$ to R$^4$ are preferably independently a hydrogen atom, a hydrocarbon group having 1 to 8 carbon atoms, a cyclic hydrocarbon group having 3 to 8 carbon atoms or an aromatic hydrocarbon group. From the viewpoint that monomer is easily available, a hydrogen atom and an alkyl group are preferable. Furthermore, either of R$^1$ to R$^4$ is preferably hydrogen atoms from the viewpoint of favorable gas barrier properties of EVOH.

The process for preparing EVOH of the present invention is not particularly limited. For example, in the case of the most preferable structure in which the 1,2-glycol bond structure is bonded directly with the main chain (n=0), examples are the method of hydrolyzing a copolymer obtained by copolymerizing 3,4-diol-1-butene, a vinyl ester monomer and ethylene; the method of hydrolyzing a copolymer obtained by copolymerizing 3,4-diacyloxy-1-butene, a vinyl ester monomer and ethylene; the method of hydrolyzing a copolymer obtained by copolymerizing 3-acyloxy-4-ol-1-butene, a vinyl ester monomer and ethylene; the method of hydrolyzing a copolymer obtained by copolymerizing 4-acyloxy-3-ol-1-butene, a vinyl ester monomer and ethylene; and the method of hydrolyzing a copolymer obtained by copolymerizing 3,4-diacyloxy-2-methyl-1-butene, a vinyl ester monomer and ethylene. As an example of the process for preparing EVOH having alkylene as a binding chain (X), there is the method of hydrolyzing a copolymer obtained by copolymerizing 4,5-diol-1-pentene, 4,5-diacyloxy-1-pentene, 4,5-diol-3-methyl-1-pentene, 5,6-diol-1-hexene or 5,6-diacyloxy-1-hexene, a vinyl ester monomer and ethylene. The method of hydrolyzing a copolymer obtained by copolymerizing 3,4-diacyloxy-1-butene, a vinyl ester monomer and ethylene is preferable from the viewpoint that copolymerization reactivity is excellent and as 3,4-diacyloxy-1-butene, 3,4-diacetoxy-1-butene is more preferably used. Also, a mixture of these monomers can be used. Furthermore, a small amount of 3,4-diacetoxy-1-butane, 1,4-diacetoxy-1-butene and 1,4-diacetoxy-1-butane can be contained as a small amount of impurities.

Further, 3,4-diol-1-butene is represented by the following formula (2), 3,4-diacyloxy-1-butene is represented by the following formula (3), 3-acyloxy-4-ol-1-butene is represented by the following formula (4) and 4-acyloxy-3-ol-1-butene is represented by the following formula (5).

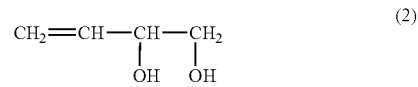

(2)

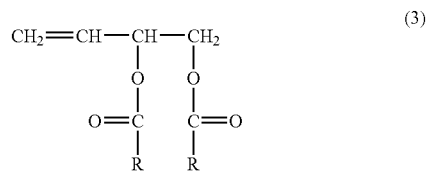

(3)

(wherein R is an alkyl group, preferably a methyl group)

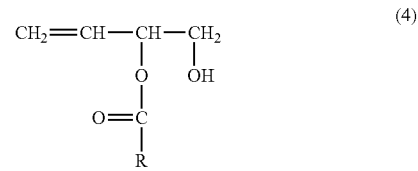

(4)

(wherein R is an alkyl group, preferably a methyl group)

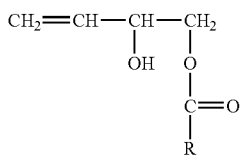

(wherein R is an alkyl group, preferably a methyl group)

The compound indicated by formula (2) is available from Eastman Chemical Co., Ltd. and the compound indicated by formula (3) is available from Eastman Chemical Co., Ltd. and Across Inc.

Examples of the vinyl ester monomer are vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate. Of these, vinyl acetate is preferably used from the viewpoint of economy.

Also, in the present invention, a copolymerizable ethylenic unsaturated monomer can be copolymerized within the range that the effects of the present invention are not lost. Examples of such monomers are olefins such as propylene, 1-butene and isobutene; unsaturated acids such as acrylic acid, methacrylic acid, crotonic acid, phthalic acid (anhydride), maleic acid (anhydride) and itaconic acid (anhydride), salts thereof and mono- or di-alkyl esters having 1 to 18 carbon atoms; acrylamides such as acrylamide, N-alkylacrylamide having 1 to 18 carbon atoms, N,N-dimethylacrylamide, 2-acrylamide propane sulfonic acid or salt thereof, acrylamide propyldimethylamine, acid salt thereof or quaternary salt thereof; methacrylamides such as methacrylamide, N-alkylmethacrylamide having 1 to 18 carbon atoms, N,N-dimethylmethacrylamide, 2-methacrylamide propane sulfonic acid or salt thereof, methacrylamide propyldimethylamine, acid salt thereof or quaternary salt thereof; N-vinylamides such as N-vinylpyrrolidone, N-vinylformamide and N-vinylacetoamide; vinyl cyanides such as acrylonitrile and methacrylonitrile; vinyl ethers such as alkyl vinyl ether having 1 to 18 carbon atoms, hydroxyalkyl vinyl ether and alkoxy alkyl vinyl ether; halogenated vinyls such as vinyl chloride, vinylidene chloride, vinyl fluoride, vinylidene fluoride and vinyl bromide; vinyl silanes; allyl acetate; allyl chloride; allyl alcohol; dimethyl allyl alcohol; trimethyl-(3-acrylamide-3-dimethylpropyl)-ammonium chloride; acrylamide-2-methyl propane sulfonic acid; vinyl ethylene carbonate and ethylene carbonate.

More examples are cation group-containing monomers such as N-acrylamidomethyl trimethylammonium chloride, N-acrylamidoethyl trimethylammonium chloride, N-acrylamidopropyl trimethylammonium chloride, 2-acryloxyethyl trimethylammonium chloride, 2-methacryloxyethyl trimethylammonium chloride, 2-hydroxy-3-methacryloyl oxypropyl trimethylammonium chloride, allyl trimethylammonium chloride, methallyl trimethylammonium chloride, 3-butene trimethylammonium chloride, dimethyl diallyl ammonium chloride and diethyl diallyl ammonium chloride, and acetoacetyl group-containing monomers.

Examples of the vinyl silanes are vinyl trimethoxysilane, vinyl methyldimethoxysilane, vinyl dimethylmethoxysilane, vinyl triethoxysilane, vinyl methyldiethoxysilane, vinyl dimethylethoxysilane, vinyl isobutyldimethoxysilane, vinyl ethyldimethoxysilane, vinyl methoxydibutoxysilane, vinyl dimethoxybutoxysilane, vinyl tributoxysilane, vinyl methoxydihexyloxysilane, vinyl dimethoxyhexyloxysilane, vinyl trihexyloxysilane, vinyl methoxydioctyloxysilane, vinyl dimethoxyoctyloxysilane, vinyl trioctyloxysilane, vinyl methoxydilauryloxysilane, vinyl dimethoxylauryloxysilane, vinyl methoxydioleyloxysilane and vinyl dimethoxyoleyloxysilane.

The copolymerization method is described below, but not limited thereto.

The method for copolymerizing 3,4-diacyloxy-1-butene, a vinyl ester monomer and an ethylene monomer is not particularly limited. Known methods such as bulk polymerization, solution polymerization, suspension polymerization, dispersion polymerization or emulsion polymerization can be employed, but usually solution polymerization is conducted.

The method for charging the monomer components when copolymerizing is not particularly limited and the components can be added all at once, in portions or continuously.

The copolymerization ratio of 3,4-diacyloxy-1-butene is not particularly limited but the copolymerization ratio can be determined according to the amount of structural unit (1) that is introduced into EVOH.

The solvent used for copolymerization is usually lower alcohols such as methanol, ethanol, propanol and butanol, and ketones such as acetone and methyl ethyl ketone. Methanol is suitably used from an industrial point of view. The amount of the solvent that is used is selected accordingly in view of the chain transfer constant of the solvent, depending on the desired polymerization degree of the copolymer. For example, when methanol is the solvent, the amount is selected from the range of S (solvent)/M (monomer)=0.01 to 10 (weight ratio), preferably 0.05 to 7 (weight ratio).

A polymerization catalyst is used for copolymerization. Examples of the polymerization catalyst are known radical polymerization catalysts such as azobisisobutyronitrile, acetyl peroxide, benzoyl peroxide and lauryl peroxide and catalysts active at low temperatures such as peroxyesters including t-butylperoxyneodecanoate, t-butylperoxypivalate, α,α'-bis(neodecanoylperoxy)diisopropylbenzene, cumylperoxyneodecanoate, 1,1,3,3-tetramethylbutylperoxyneodecanoate, 1-cyclohexyl-1-methylethylperoxyneodecanoate, t-hexylperoxyneodecanoate and t-hexylperoxypivalate; peroxydicarbonates including di-n-propylperoxydicarbonate, di-iso-propylperoxydicarbonate, di-sec-butylperoxydicarbonate, bis(4-t-butylcyclohexyl)peroxydicarbonate, di-2-ethoxyethylperoxydicarbonate, di(2-ethylhexyl)peroxydicarbonate, dimethoxybutylperoxydicarbonate and di(3-methyl-3-methoxybutylperoxy)dicarbonate; and diacylperoxides including 3,3,5-trimethylhexanoylperoxide diisobutyrylperoxide and lauroylperoxide.

The amount of the polymerization catalyst that is used depends on the type of catalyst and is selected according to the polymerization rate. For example, in the case that azobisisobutyronitrile or acetyl peroxide is used, the amount is preferably 10 to 2000 ppm, preferably 50 to 1000 ppm, based on the vinyl ester monomer.

Also, the reaction temperature of the copolymerization reaction is preferably selected from the range of 40° C. to the boiling point depending on the solvent that is used and the pressure.

In the present invention, a hydroxylactone compound or hydroxycarboxylic acid is preferably included together with the catalyst, from the viewpoint that the color tone of the obtained EVOH is favorable (approaching to colorless). The hydroxylactone compound is not particularly limited as long as it is a compound having a lactone ring and a hydroxy group in the molecule. Examples are L-ascorbic acid, erythorbic acid and gluconodeltalactone and L-ascorbic acid and erythorbic acid are suitably used. Examples of the hydroxycarboxylic acid are glycolic acid, lactic acid, glyceric acid, malic acid, tartaric acid, citric acid and salicylic acid and citric acid is suitably used.

The amount of the hydroxylactone compound or hydroxycarboxylic acid is preferably 0.0001 to 0.1 part by weight (more preferably 0.0005 to 0.05 part by weight, particularly 0.001 to 0.03 part by weight) based on 100 parts by weight of vinyl acetate, in the case of both batch-wise and continuous adding. When the amount is less than 0.0001 part by weight, the effects of adding cannot be obtained and when the amount is more than 0.1 part by weight, polymerization of vinyl acetate is inhibited, thus being unfavorable. The method for adding the compound is not particularly limited, but usually the compound is diluted by a solvent such as water or aliphatic ester containing lower aliphatic alcohol or vinyl acetate and then added into the polymerization system.

Then, the copolymer obtained is hydrolyzed but the hydrolyzing is carried out in a state in which the copolymer obtained in the above is dissolved in alcohol or alcohol containing water, using alkali catalyst or acid catalyst. Examples of the alcohol are methanol, ethanol, propanol and tert-butanol and methanol is preferably used in particular. The concentration of the copolymer in the alcohol is suitably selected according to the viscosity of the system, but usually selected from a range of 10 to 60% by weight.

Examples of the catalyst used for the hydrolyzing are alkali catalysts such as the hydroxides of alkali metal and alcoholates including sodium hydroxide, potassium hydroxide, sodium methylate, sodium ethylate, potassium methylate and lithium methylate; and acid catalysts such as sulfuric acid, hydrochloric acid, nitric acid, metasulfonic acid, zeolite and cation-exchange resin. The amount of the hydrolyzing catalyst is suitably selected according to the hydrolyzing method, the desired degree of hydrolyzing and the like, but when an alkali catalyst is used, the amount is suitably 0.001 to 0.1 equivalent and preferably 0.005 to 0.05 equivalent, based on the total amount of monomers such as vinyl ester monomer and 3,4-diacyloxy-1-butene.

Concerning the hydrolyzing method, either of batch hydrolysis, continuous hydrolysis on a belt and column continuous hydrolysis can be carried out in accordance with the hydrolysis degree aimed, and column hydrolysis under fixed pressurization is preferably used because the amount of alkali catalyst can be reduced at the hydrolysis and the hydrolyzing reaction proceeds easily at high efficiency. Further, pressure at the hydrolysis cannot be categorically said depending on the objective ethylene content, but is selected from a range of 2 to 7 kg/cm$^2$ and the temperature is selected from 80 to 150° C. and preferably 100 to 130° C.

As described above, EVOH of the present invention can be obtained by a step of copolymerizing 3,4-diacyloxy-1-butene and the like, vinyl ester monomer and ethylene to prepare a copolymer and a step of hydrolyzing the copolymer. The ethylene content and the hydrolysis degree of the EVOH of the present invention is not particularly limited, but the ethylene content is 10 to 60% by mol (further, 20 to 50% by mol and in particular 25 to 48% by mol) and the hydrolysis degree is at least 90% by mol (further, at least 95% by mol and in particular at least 99% by mol) are preferable. When the ethylene content is less than 10% by mol, the gas barrier properties and appearance at high humidity tend to be lowered and to the contrary, when it exceeds 60% by mol, the gas barrier properties tend to be lowered. Further, when the degree of hydrolysis is less than 90% by mol, the gas barrier properties, moisture resistance and the like tend to be lowered, thus being unpreferable.

The melt flow rate (MFR) (210° C. and a load of 2160 g) is not particularly limited, but is preferably 0.1 to 100 g/10 minutes (further 0.5 to 50 g/10 minutes and in particular 1 to 30 g/10 minutes). When the melt flow rate is less than the range, the inside of an extruder becomes a high torque state at molding and extrusion molding and injection molding tend to be difficult. Further, when it is larger than the range, appearance and the gas barrier properties used for a multi-layer container by thermal stretching molding tend to be lowered, thus being unpreferable.

The amount of the structural unit of the above formula (1) (structural unit having 1,2-glycol bond) introduced in the EVOH of the present invention is not particularly limited, but 0.1 to 30% by mol (further 0.5 to 20% by mol and in particular 1 to 10% by mol) is preferable. When the introduction amount is less than 0.1% by mol, the effect of the present invention is not adequately exhibited and to the contrary, when it exceeds 30% by mol, the gas barrier properties tend to be lowered, thus being unpreferable. Further, when the amount of the structural unit having 1,2-glycol bond is adjusted, it can be also adjusted by blending at least two kinds of EVOH wherein the introduction amount of the structural unit having 1,2-glycol bond differs. In this case, the difference of the ethylene content of the EVOH is preferably less than 2% by mol. Further, among them, there is no problem even if at least one of them has not the structural unit having 1,2-glycol bond.

Further, in the present invention, 2 or more of EVOH are preferably used by blending because the amount of the structural unit of formula (1) is not adjusted and the gas barrier properties and pressure resistance are improved. The blending EVOH is not particularly limited so far as they differ in the ethylene content, but it is preferable that the difference between the ethylene content of EVOH (a) having the maximum content ratio and the ethylene content of EVOH (b) having much of the content ratio in the secondary position is 2 to 20% by mol (further 3 to 15% by mol and in particular 4 to 13% by mol). When the difference of the ethylene content is less than 2% by mol, the effect of blending two EVOH is not obtained and to the contrary, when it exceeds 20% by mol, the transparency is bad, thus being unpreferable. However, when EVOH having the same content ratio and different ethylene content exists, a combination by which the difference of the ethylene content is the maximum is selected and it is referred to as the difference of the ethylene content.

The blend ratio of two or more of the EVOH is not particularly limited, but for example, when the blend of EVOH is 2 kinds of the EVOH (a) and EVOH (b), the weight ratio is preferably EVOH (a)/EVOH (b)=99/1 to 55/45 (further 99/1 to 60/40). When it exceeds 99/1 or when it is less than 55/45, the effect of blending 2 kinds of EVOH is not obtained. Further, the blend of the EVOH is 3 kinds of the EVOH (a), EVOH (b) and EVOH (c) and when EVOH having the largest weight ratio is referred to as the EVOH (a), EVOH having secondary large weight ratio is referred to as the EVOH (b) and EVOH having tertiary large weight ratio is referred to as the EVOH (c) (the weight ratio of EVOH (b) and the EVOH (c) may be the same), the weight ratio is preferably EVOH (a)/EVOH (b)=99/1 to 55/45 (further 99/1 to 60/40). When it exceeds 99/1 or when it is less than 55/45, the effect of blending a plural number of EVOH is not obtained. As the weight ratio of the total amount of the EVOH (a) and EVOH (b) and the EVOH (c), EVOH (a)+EVOH (b)/EVOH (c)=99/1 to 67/33 is selected. Furthermore, when EVOH (b) and EVOH (c) are the same weight ratio based on the total EVOH, a combination in which the difference of the ethylene content between EVOH (a) and EVOH (b) is the largest is selected.

As the EVOH composition of the present invention, all of EVOH in the composition may have the structural unit (1) and only a portion of EVOH may have the structural unit (1), but it is preferable that the EVOH having secondary large weight ratio contains the structural unit (1) because the gas barrier properties become good.

The method of blending 2 kinds of the EVOH is not particularly limited and examples are a method of dissolving respective EVOH in solvent such as water-alcohol and dimethylsulfoxide and mixing them in a solution state, a method of mixing ethylene-vinyl acetate copolymers before hydrolysis of respective EVOH in a state in which they are dissolved in alcohol solvent such as methanol and simultaneously hydrolyzing the mixture, or a method of mixing respective EVOH by melting, but the method of melt mixing is usually adopted.

Example of the method of melt mixing is a method of carrying out using known kneading devices such as a kneader ruder, an extruder, a mixing roll, a Banbury mixer and a plast mill, but it is preferable to usually use a uniaxial or biaxial extruder industrially. Further, it is preferable to provide a vent suction device, a gear pump device, a screen device and the like, if necessary. In particular, the EVOH composition having excellent quality in which thermal coloring and thermal decomposition are reduced, can be obtained by providing 1 or more of vent holes in the extruder and sucking under reduced pressure in order to remove moisture and by-products (thermally degraded articles having low molecular weight, and the like) and by continuously feeding inactive gas such as nitrogen in a hopper in order to prevent the contamination of oxygen into the extruder.

Further, a method of feeding respective EVOH is not particularly limited, and includes (1) a method of preliminarily blending (the above solution mixing, mixing before hydrolysis and the like) before feeding the respective EVOH to the extruder, (2) a method of dry-blending the respective EVOH and collectively feeding them to the extruder, (3) a method of feeding one or more of EVOH to the extruder to be melt and feeding other solid EVOH thereto (solid side feeding method), (4) a method of feeding one or more of EVOH to the extruder to be melt and feeding other melt EVOH thereto (melt side feeding method), and the like. Among these, the method of (2) is industrially used practically from the viewpoints of the convenience of the device, the cost of blended articles and the like.

The EVOH of the present invention can be used for melt molding as it is, but may compound lubricants such as saturated aliphatic amide (for example, stearamide and the like), unsaturated fatty acid amide (for example, oleamide and the like), bis fatty acid amide (for example, ethylene bis(stearamide) and the like), a metal salt of fatty acid (for example, calcium stearate, magnesium stearate and the like) and low molecular weight polyolefin (for example, low molecular weight polyethylene with a molecular weight of about 500 to 10,000 or low molecular weight polypropylene and the like); inorganic salts (for example, hydrotalcite and the like); plasticizers (for example, aliphatic polyvalent alcohols such as ethylene glycol, glycerin and hexane diol, and the like); oxygen absorbents (for example, as inorganic oxygen absorbents, reduced iron powders, those in which a water-absorbing substance, an electrolyte and the like are added thereto, aluminum powder, potassium sulfite, photo catalyst titanium oxide and the like; as organic compound oxygen absorbents, ascorbic acid, fatty acid ester thereof, a metal salt thereof and the like, polyvalent phenols such as hydroquinone, gallic acid and hydroxy group-containing phenol aldehyde resin; the coordination bonded bodies of a nitrogen-containing compound with transition metal such as bis-salicylaldehyde-imine cobalt, tetraethylenepentamine cobalt, cobalt-Schiff base complex, porphyrins, macrocyclic polyamine complex and polyethyleneimine-cobalt complex, terpene compounds, the reaction product of amino acids with a hydroxyl group-containing reductive substance and triphenylmethyl compounds; as polymer oxygen absorbents, the coordination bonded bodies of a nitrogen-containing resin with transition metal (for example, a combination of MXD Nylon with cobalt), the blend product of a tertiary hydrogen-containing resin with transition metal (for example, a combination of a polypropylene with cobalt), the blend product of a carbon-carbon unsaturated bond-containing resin with transition metal (for example, a combination of polybutadiene with cobalt), photo oxidation degradative resin (example; polyketone), anthraquinone polymer (example, polyvinylanthraquinone) and the like, those in which a photo initiator (benzophenone and the like), a peroxide catching agent (a commercially available antioxidant and the like) and a deodorant (active carbon and the like) are added); a thermal stabilizer; a photo stabilizer; an antioxidant; an ultraviolet absorbent; a coloring agent; an antistatic agent; a surfactant; an antibiotics, an anti-blocking agent; a slipping agent; a filler (for example, inorganic filler and the like); other resins (for example, polyolefin, polyamide and the like), and the like, within the range that the purpose of the present invention are not inhibited.

Further, it is preferable from the viewpoint of improving the thermal stability of a resin that acids such as acetic acid and phosphoric acid; metal salts such as alkali metal, alkali earth metal and transition metal; and boric acid and its salt as a boron compound, within the range that the purpose of the present invention are not inhibited.

The addition amount of acetic acid is preferably 0.001 to 1 part by weight (further, 0.005 to 0.2 part by weight and in particular 0.010 to 0.1 part by weight) based on 100 parts by weight of the EVOH. When the addition amount is less than 0.001 part by weight, the containing effect tend to not be obtained adequately and to the contrary, when it exceeds 1 part by weight, the appearance of a molded article obtained tends to be deteriorated, thus being unpreferable.

Further, examples of the metal salt are metal salts such as sodium, potassium, calcium, magnesium of organic acids such as acetic acid, propionic acid, butyric acid, lauryl acid, stearic acid, oleic acid and behenic acid and inorganic acids such as sulfuric acid, sulfurous acid, carbonic acid and phosphoric acid. A salt of acetic acid, a salt of phosphoric acid and a salt of hydrogen phosphoric acid are preferable. Further, the addition amount of the metal salt is preferably 0.0005 to 0.01 part by weight (further, 0.001 to 0.05 part by weight and in particular 0.002 to 0.03 part by weight), converted to metal, based on 100 parts by weight of EVOH. When the addition amount is less than 0.0005 part by weight, the containing effect tends to not be obtained adequately and to the contrary, when it exceeds 0.01 part by weight, the appearance of a molded article obtained tends to be deteriorated, thus being unpreferable. Further, when 2 or more of the salts of alkali metal and/or the salts of alkali earth metal are added to EVOH, the total amount is preferably within the range of the above addition amount.

Examples of the metal salt of boric acid are calcium borate, zinc borate (zinc tetraborate, zinc metaborate and the like), potassium aluminum borate, ammonium borate (ammonium metaborate, ammonium tetraborate, ammonium pentaborate, ammonium octaborate and the like), cadmium borate (cadmium orthoborate, cadmium tetraborate and the like), potassium borate (potassium metaborate, potassium tetraborate, potassium pentaborate, potassium hexaborate, potassium octaborate and the like), silver borate (silver metaborate, silver tetraborate and the like), copper borate (copper (II) borate, copper metaborate, copper tetraborate and the like), sodium borate (sodium metaborate, sodium diborate, sodium tetraborate, sodium pentaborate, sodium hexaborate, sodium octaborate and the like), lead borate (lead metaborate, lead hexaborate and the like), nickel borate (nickel orthoborate, nickel diborate, nickel tetraborate, nickel octaborate and the like), barium borate (barium orthoborate, barium metaborate, barium diborate, barium tetraborate and the like), bismuth borate, magnesium borate (magnesium orthoborate, magnesium diborate, magnesium metaborate, trimagnesium tetraborate, pentamagnesium tetraborate and the like), manganese borate (manganese (I) borate, manganese metaborate, manganese tetraborate and the like), lithium borate (lithium metaborate, lithium tetraborate, lithium pentaborate and the like), additionally, borate minerals such as borax, kernite, Inyonite, Kotoite, Suanite and Szaibelyite. Borax, boric acid and sodium borate (sodium metaborate, sodium diborate, sodium tetraborate, sodium pentaborate, sodium hexaborate, sodium octaborate and the like) are preferable. Further, the addition amount of the boron compound is preferably 0.001 to 1 part by weight (further, 0.002 to 0.2 part by weight and in particular 0.005 to 0.1 part by weight), converted to boron, based on 100 parts by weight of the EVOH in the composition. When the addition amount is less than 0.001 part by weight, the containing effect tend to not be obtained adequately and to the contrary, when it exceeds 1 part by weight, the appearance of a molded article obtained tends to be deteriorated, thus being unpreferable.

The method of adding acids and metal salts to the EVOH is not particularly limited and includes (1) a method of bringing the porous precipitates of the EVOH with a water-containing ratio of 20 to 80% by weight in contact with acids and the aqueous solution of metal salts, letting them contain acids and metal salts and drying them; (2) a method of letting the homogeneous solution (water/alcohol solution and the like) of the EVOH contain acids and metal salts, then extruding the mixture in a strand shape into coagulation solution, then cutting the obtained strand to prepare pellets and drying them; (3) a method of collectively mixing the EVOH with acids and metal salts and then melt-kneading the mixture with an extruder and the like; (4) a method of neutralizing alkali (sodium hydroxide, potassium hydroxide and the like) used in the hydrolyzing step with acids such as acetic acid at the production of the EVOH and adjusting the amount of remaining acids such as acetic acid and alkali metal salts such as sodium acetate and potassium acetate that are prepared as by-products, by the treatment of water rinsing, etc. In order to more remarkably obtain the effect of the present invention, the methods of (1), (2) or (4) that are superior in the dispersion of acids and metal salts are preferable.

The EVOH composition obtained by the above methods of (1), (2) or (4) is dried thereafter. As the drying method, various drying methods can be adopted. For example, there are mentioned fluidized drying by which the substantially pellet type EVOH composition is stirred and dispersed mechanically or hot wind; and static drying by which the substantially pellet type EVOH composition is dried without providing dynamic action such as stirring and dispersion. A drier for carrying out the fluidized drying includes a columnar groove type stirring drier, a column tube drier, a rotary drier, a fluidized bed drier, a vibration fluidized bed drier, a cone rotary drier and the like. Further, a drier for carrying out static drying includes a batch type box drier as material static type, a band drier, a tunnel drier and a vertical drier as a material transfer type, and the like, but is not limited to these. The fluidized drying and static drying can be carried out in combination.

Air or inactive gas (nitrogen, helium gas, argon gas and the like) is used as heating gas used at the drying processing. The temperature of the heating gas is preferably 40 to 150° C. from the viewpoints of productivity and the prevention of thermal decomposition of the EVOH. The time of drying processing is preferably 15 minutes to 72 hours usually depending on the moisture content and processing amount of the EVOH composition from the viewpoints of productivity and the prevention of thermal decomposition of the EVOH.

The EVOH composition is dried under the above condition, but the moisture content of the EVOH composition after drying treatment is preferably 0.001 to 5% by weight (further, 0.01 to 2% by weight and in particular 0.1 to 1% by weight). When the moisture content is less than 0.001% by weight, long run moldability tends to be lowered and to the contrary, when it exceeds 5% by weight, foaming tends to be generated at extrusion molding, thus being unfavorable.

Thus, the EVOH of the present invention is obtained, but the EVOH of the present invention may contain a little residual monomer (3,4-diol-1-butene, 3,4-diacyloxy-1-butene, 3-acyloxy-4-ol-1-butene, 4-acyloxy-3-ol-1-butene, 4,5-diol-1-pentene, 4,5-diacyloxy-1-pentene, 4,5-diol-3-methyl-1-pentene, 5,6-diol-1-hexene, 5,6-diacyloxy-1-hexene, 4,5-diacyloxy-2-methyl-1-butene and the like) and the hydrolyzed product of the monomer (3,4-diol-1-butene, 4,5-diol-1-pentene, 4,5-diol-3-methyl-1-pentene, 4,5-diol-3-methyl-1-pentene, 5,6-diol-1-hexene and the like), within the range that the purpose of the present invention are not inhibited.

The EVOH of the present invention is useful for a molded article and in particular useful for melt molding. It can be used for the production of a single layer or multilayer (laminated layers) film and sheet, a container, a bottle, a tube and the like. The example of the lamination method being laminated with other substrate includes a method of melt-extruding other substrate to be laminated on the film, sheet and the like of EVOH composition of the present invention; to the contrary, a method of melt-extruding the resin to be laminated on other substrate; a method of co-extruding the resin and other substrate; a method of dry-laminating the resin (layer) and other substrate (layer) using known adhesives such as an organotitanium compound, an isocyanate compound, a polyester compound and a polyurethane compound; and the like. The melt molding temperature at the above melt extrusion is often selected from a range of 100 to 300° C.

As the other substrate, a thermoplastic resin is useful and the specific example includes broad polyolefin resins such as homo- or copolymers of olefin such as linear low density polyethylene, low density polyethylene, ultra low density polyethylene, middle density polyethylene, high density polyethylene, an ethylene-vinyl acetate copolymer, an ionomer, an ethylene-propylene (block and random) copolymer, an ethylene-acrylic acid copolymer, an ethylene-acrylate copolymer, polypropylene, propylene-α-olefin (α-olefin having 4 to 20 carbon atoms) copolymer, polybutene and polypentene, polymers modified by grafting unsaturated carboxylic acid or its ester with these homo- or copolymers of olefin, a polyester resin, a polyamide resin (also including copolymerization polyamide), polyvinyl chloride, polyvinylidene chloride, an acryl resin, polystyrene, a vinyl ester resin, a polyester elastomer, a polyurethane elastomer, chlorinated polyethylene, chlorinated polypropylene, aromatic or aliphatic polyketone, polyalcohols obtained by reducing these, additionally, other EVOH, etc. From the points of the practicability such as physical properties (in particular, strength) of laminates, polypropylene, an ethylene-propylene (block and random) copolymer, polystyrene, polyethylene terephthalate (PET), polyethylene naphthalate (PEN) are preferably used Further, when other substrate is coated by extrusion on the molded articles such as films and sheets of the EVOH of the present invention and the films and sheets of other substrate are laminated on the molded articles of the present invention using an adhesive, arbitrary substrates (paper, metal foil, uniaxially or biaxially stretch plastic film or sheet and an article deposited with an inorganic substance, fabric, non woven fabric, metal cotton, wooden article and the like) other than the above-mentioned thermoplastic resin can be used as the substrate.

As the layer composition of the laminate obtained by the EVOH of the present invention and other substrate, when the layer of the EVOH composition of the present invention is referred to as a ($a_1, a_2, \ldots$) and other substrate, for example, a thermoplastic resin layer is referred to as b ($b_1, b_2, \ldots$), not only the double layer structure of a/b but also arbitrary combinations such as b/a/b, a/b/a, $a_1/a_2/b$, $a/b_1/b_2$, $b_2/b_1/a/b_1/b_2$ and $b_2/b_1/a/b_1/a/b_1/b_2$ are possible if the molded article is film, sheet or bottle shape. Further, when a regrind layer comprising a mixture of at least the EVOH composition and the thermoplastic resin is referred to as R, b/R/a, b/R/a/b, b/R/a/R/b, b/a/R/a/b, b/R/a/R/a/R/b and the like are also possible and arbitrary combinations such as bimetal type for a, b, a core (a)-sheath (b) type, a core (b)-sheath (a) type or eccentric core sheath type are possible for filament shape. Further, in the above layer composition, laminate having excellent stretching property, can be obtained by providing an adhesive resin layer at respective interlayers if necessary. As the adhesive resin, various resins can be used and it differs depending on the kind of the resin of b, which cannot be categorically mentioned. However, a modified olefin polymer containing carboxyl groups obtained by chemically bonding unsaturated carboxylic acid or its anhydride with an olefin polymer (the above broad polyolefin resin) by addition reaction and graft reaction can be mentioned. Specifically, there can be preferably mentioned the mixture of one or two or more of polymers selected from a maleic anhydride graft modified polyethylene, a maleic anhydride graft modified polypropylene, a maleic anhydride graft modified ethylene-propylene (block or random) copolymer, a maleic anhydride graft modified ethylene-ethyl acrylate copolymer, a maleic anhydride graft modified ethylene-vinyl acetate copolymer and the like. The amount of unsaturated carboxylic acid or its anhydride contained in the thermoplastic resin is preferably 0.001 to 3% by weight, more preferably 0.01 to 1% by weight and preferably 0.03 to 0.5% by weight in particular. When the modified amount in the modified product is little, adhesiveness is occasionally inadequate, and to the contrary, when it is much, crosslinking reaction occurs and moldability is occasionally deteriorated, thus being unfavorable. The EVOH composition of the present invention, other EVOH, rubber-elastomer components such as a polyisobutylene and an ethylene-propylene rubber, the resin of the b layer and the like can be blended with these adhesive resins. In particular, the adhesiveness is occasionally improved by blending a polyolefin resin different from the polyolefin resin being the main component of the adhesive resin and it is useful.

The thicknesses of the respective layers of the laminate obtained from the EVOH of the present invention and other substrate are not categorically mentioned depending on the layer composition, the kind of b, uses, container mode, requested physical properties and the like, but the layer a is usually selected from a range of about 2 to 500 µm (further, 3 to 200 µm), the layer b is selected from a range of about 10 to 5000 µm (further, 30 to 1000 µm), and the adhesive resin layer is usually selected from a range of about 1 to 400 µm (further, 2 to 150 µm).

Further, the substrate resin layer may contain an antioxidant, an antistatic agent, a lubricant, a nuclear material, an anti-blocking agent, an ultraviolet absorbent, wax and the like.

When the obtained laminate is molded to a container, the effect of the present invention is expressed, but its molding method includes vacuum molding, pneumatic molding or vacuum pneumatic molding, and if necessary, a method of molding to a mold shape using a plug together (straight method, drape method, air slipping method, snapback method, plug assist method and the like). Various molding conditions such as molding temperature, the degree of vacuum, the pressure of pneumatic or molding speed are appropriately set depending on a plug shape, a mold shape or the quality of the material sheet. Containers having good appearance, gas barrier property and strength can be obtained by using the EVOH of the present invention even if a container with deep bottom in which a drawing ratio is 2.5 or more is molded. Further, the drawing ratio mentioned here is indicated by a value obtained by dividing the depth of drawing by the average diameter of the upper face of a cup.

Further, the biaxially stretch blow bottle of the present invention comprises an intermediary layer comprising the EVOH of the present invention and both outer layers comprising a thermoplastic polyester resin. The thermoplastic polyester resin is not particularly limited and for example, a condensation polymer in which aromatic dicarboxylic acid or alkyl ester thereof and glycol are main component is mentioned and typically, a polymer having ethylene terephthalate as a main repeating unit is preferable. Further, copolymer components can be also contained within a range without significantly damaging processability, strength and the like. The copolymerization component includes as an acid component, aromatic dicarboxylic acids such as isophthalic acid, diphenyl-4,4'-dicarboxylic acid, diphenoxyethane dicarboxylic acid, 2,6-naphthalene dicarboxylic acid and 2,7-naphthalene dicarboxylic acid and ester forming derivatives thereof; aliphatic dicarboxylic acids such as adipic acid, sebacic acid, azelaic acid and succinic acid and ester forming derivatives thereof; alicyclic dicarboxylic acids such as cyclohexanedicarboxylic acid and hexahydroterephthalic acid and ester forming derivatives thereof; oxy acids such as p-oxybenzoic acid and oxocaproic acid and ester forming derivatives thereof; additionally, trimellitic acid, pyromellitic acid and the like. Further, the glycol component includes aliphatic glycols such as diethylene glycol, trimethylene glycol, tetramethylene glycol and neopentyl glycol; alicyclic glycols such as 1,4-cyclohexanedimethanol; aromatic glycols such as bisphenol A and the alkylene oxide adduct of bisphenol A; polyalkylene glycols such as polyethylene glycol, polypropylene glycol and polytetramethylene glycol; additionally, glycerin, 1,3-propane diol, pentaerythritol and the like.

The content of the ethylene terephthalate unit in the thermoplastic polyester resin is 75 to 100% by mol and preferably about 85 to 100% by mol. Further, the preferable intrinsic viscosity (measurement is carried out at a temperature of 30° C. in mix solvent of 50% by weight/50% by weight of phenol to tetrachloroethane) is 0.5 to 1.3 dl/g (further, 0.65 to 1.2 dl/g).

Further, as the thermoplastic polyester resin, those in which ethylene terenaphthalate is a main repeating unit can be also used in addition to those in which ethylene terephthalate is a main repeating unit. A copolymerization component similar as ethylene terephthalate can be also contained.

The content of the ethylene terenaphthalate unit is 75 to 100% by mol and preferably about 85 to 98% by mol. Further, the preferable intrinsic viscosity is 0.4 to 1.2 dl/g (further, 0.55 to 1.0 dl/g).

Further, it is also preferable from the viewpoint of improving the gas barrier property, ultraviolet shielding property and melt moldability that the above ethylene terephthalate polyester resin and ethylene terenaphthalate polyester resin are blended to be used. In that case, the blend ratio is 5 to 90% by weight and further 15 to 85% by weight of the ethylene terephthalate polyester resin and 95 to 10% by weight and further 85 to 15% by weight of the ethylene terenaphthalate polyester resin.

Further, other thermoplastic resin and an additive can be also compounded within a range not damaging various properties greatly. The thermoplastic resin includes MXD-6-Nylon, polycarbonate, polyarylate, liquid crystal polymer and the like.

The EVOH of the present invention and the polyester resin are molded to a bottle mainly by melt molding. The molding method of a biaxially stretch blow bottle is explained below.

When the biaxially stretched blown bottle of the present invention is produced, it is not particularly limited, but a co-injection biaxially stretch blow molding method is mentioned as the most preferable method in particular and the method is further specifically explained below, but it is not limited thereto.

The co-injection biaxially stretch blow molding method is a method which comprises preparing a parison (the precursor of a container and also called as preform) having a multi-layer structure, which comprises an EVOH containing layer as an intermediary layer and a thermoplastic polyester resin layer at both sides of the EVOH containing layer, by co-injection molding, heating and mechanically stretching to a vertical direction while keeping it at constant temperature in a blow mold, and swelling to a circumferential direction simultaneously or successively by blowing the pressurized air.

The parison having a multi-layer structure is obtained by simultaneously or staggeringly injecting the melt EVOH and the thermoplastic polyester resin from respective injection cylinders through a multilayer manifold system in a single mold usually using an injection machine having two injection cylinders and the multilayer manifold system.

For example, the thermoplastic polyester resin for both outer layers is injected in advance, then the EVOH being an intermediary layer is injected, a fixed amount of the EVOH is injected, then, the injection of the thermoplastic polyester resin is continued and thereby, there is obtained a parison with bottom that comprises 3 layer composition of the thermoplastic polyester resin layer/EVOH layer/thermoplastic polyester resin and in which the intermediary EVOH layer is perfectly encapsulated in the thermoplastic polyester resin layers at both sides.

As the injection molding condition of the parison, the injection molding temperature of the EVOH is preferably 150 to 300° C. (further, 160 to 270° C. and in particular 170 to 230° C.). When the temperature is less than 150° C., the melt of EVOH is occasionally inadequate, and to the contrary, when it exceeds 300° C., the appearance of the biaxially stretch blow bottle obtained is deteriorated by the thermal decomposition of EVOH and odor is remarkable, thus being unfavorable.

On the other hand, the injection molding temperature of the thermoplastic polyester resin is preferably 230 to 350° C. (further, 250 to 330° C. and in particular 270 to 310° C.). When the temperature is less than 230° C., the melt of the thermoplastic polyester resin is occasionally inadequate, and to the contrary, when it exceeds 350° C., the appearance of the biaxially stretch blow bottle obtained is deteriorated by the thermal decomposition of the thermoplastic polyester resin and odor is remarkable, thus being unfavorable.

Further, the temperature of the multilayer manifold portion at which EVOH and the thermoplastic polyester resin are merged is preferably 230 to 350° C. (further, 250 to 330° C. and in particular 270 to 310° C.). When the temperature is less than 230° C., the melt of the thermoplastic polyester resin is occasionally inadequate, and to the contrary, when it exceeds 350° C., the appearance of the obtained biaxially stretch blow bottle is deteriorated by the thermal decomposition of EVOH and the thermoplastic polyester resin and odor is remarkable, thus being unfavorable.

Further, the temperature of a mold in which EVOH and the thermoplastic polyester resin flow is preferably 0 to 80° C. (further, 5 to 60° C. and in particular 10 to 30° C.). When the temperature is less than 0° C., dew drops on the mold occasionally occur and the appearance of the parison and the obtained biaxially stretch blow bottle are lowered and to the contrary, when it exceeds 80° C., the blow moldability of the obtained parison is lowered and the transparency of the obtained biaxially stretch blow bottle is occasionally lowered, thus being unfavorable.

Thus, the parison having a multilayer structure is obtained. Then, the objective biaxially stretch blow bottle is obtained by heating the parison again or directly as it is, mechanically stretching it to a vertical direction while keeping it at constant temperature in a blow mold and simultaneously or successively blowing pressurized air to swell it to a circumferential direction.

A system of immediately feeding the injection molded parison to a re-heating step in a state in which it is warm and carrying out blow molding is a hot parison method and a system of storing the injection molded parison for a fixed time in room temperature state and then feeding it to a re-heating step to carry out blow molding is a cold parison method. Both are adopted in accordance with purpose but in general, the cold parison method is preferable because it is superior in productivity.

When the parison is heated again, the heating can be carried out using heating elements such as an infrared heater, a block heater and the like. The temperature of the heated parison is preferably 80 to 140° C. (further, 85 to 130° C. and in particular 90 to 120° C.). When the temperature is less than 80° C., the uniformity of stretching is inadequate and the shape and thickness of the obtained multilayer container are occasionally inhomogeneous, and to the contrary, when it exceeds 140° C., the crystallization of the thermoplastic polyester resin is accelerated and the obtained multilayer container is occasionally whitened, thus being unfavorable.

Then, the objective biaxially stretch blow bottle is obtained by biaxially stretching the parison heated again. In general, the objective biaxially stretch blow bottle is obtained by being mechanically stretched by about 1 to 7 times with a plug, a rod and the like to a vertical direction and then being stretched by pneumatic force by about 1 to 7 times to a horizontal direction. The stretching to a vertical direction and the stretching to a horizontal direction can be simultaneously carried out and can be also carried out successively. Further, the pneumatic force can be also used in combination at the stretching to a vertical direction.

As the layer composition of the biaxially stretch blow bottle of the present invention, when the EVOH containing layer (hereinafter, occasionally called as EVOH layer merely)

is referred to as I and the thermoplastic polyester resin layer is referred to as II, not only 3 layer structure of II/I/II, but also arbitrary combinations of II/I/II/I, II/I/II/I/II, II/I/II/I/II/I, II/I/II/I/II/I/II and the like are possible. Further, a regrind layer and the thermoplastic resin layer other than EVOH and the thermoplastic polyester resin can be also provided. The thermoplastic resin is not particularly limited and includes broad polyolefin resins such as the homo- or copolymers of olefin such as linear low density polyethylene (LLDPE), low density polyethylene (LDPE), very low density polyethylene (VLDPE), middle density polyethylene (MDPE), high density polyethylene (HDPE), an ethylene-vinyl acetate copolymer (EVA), an ionomer, an ethylene-propylene (block and random) copolymer, an ethylene-acrylic acid copolymer, an ethylene-acrylate copolymer, an ethylene-methacrylic acid copolymer, an ethylene-methacrylate copolymer, polypropylene (PP), propylene-α-olefin (α-olefin having 4 to 20 carbon atoms) copolymer, polybutene, polypentene and polymethylpentene, blend polymers thereof, a polyester resin, a polyamide resin, copolymerization polyamide, a polystyrene resin, a polyvinyl chloride resin, a polyvinylidene chloride, an acryl resin, a vinyl ester resin, a polyester elastomer, a polyurethane elastomer, chlorinated polyethylene, chlorinated polypropylene, an aromatic or aliphatic polyketone, aliphatic polyalcohols, etc.

Further, the thicknesses of respective layers of the biaxially stretch blow bottle is not categorically mentioned depending on the layer composition and uses, but the EVOH layer is preferably 1 to 100 µm (further, 5 to 50 µm) usually and the thermoplastic polyester resin layer is preferably 20 to 3000 µm (further, 50 to 1000 µm). When the EVOH layer is less than 1 µm, the gas barrier property is occasionally insufficient and the control of the thickness is occasionally unstable and to the contrary, when it exceeds 100 µm, it is not preferable because impact resistance is occasionally inferior and it is not economic. When the thermoplastic polyester resin layer is less than 20 µm, pressure-resistance strength is occasionally insufficient and to the contrary, when it exceeds 3000 µm, it is not preferable because weight is enlarged and it is not economic.

In the biaxially stretch blow bottle of the present invention, additives such as a plasticizer, a lubricant, a thermal stabilizer, a photo stabilizer, an ultraviolet absorbent, an antioxidant, a coloring agent, an antistatic agent, a surfactant, an antibiotics and an inorganic filler can be compounded for the resins of respective layers other than EVOH and the thermoplastic polyester resin, and other resin can be compounded, within a range not deviating the purpose of the present invention. In particular, as a gel generating inhibitor, thermal stabilizers such as hydrotalcyte compound, hindered phenol and hindered amine and the metal salt of higher aliphatic carboxylic acid can be also added.

Further, an oxygen absorbent can be also compounded for the resins of respective layers other than EVOH and the thermoplastic polyester resin and it is preferable because oxygen shielding property from the outside of the biaxially stretch blow bottle and the residual oxygen removal property in the inside are improved. As oxygen absorbents, inorganic oxygen absorbents include reduced iron powders, those in which a water-absorbing substance, an electrolyte and the like are added thereto, aluminum powder, potassium sulfite, photo catalyst titanium oxide and the like; organic compound oxygen absorbents include ascorbic acid, fatty acid ester thereof, a metal salt thereof and the like, polyvalent phenols such as hydroquinone, gallic acid and hydroxy group-containing phenol aldehyde resin; the coordination bonded bodies of a nitrogen-containing compound with transition metal such as bis-salicylaldehyde-imine cobalt, tetraethylenepentamine cobalt, cobalt-Schiff base complex, porphyrins, macrocyclic polyamine complex and polyethyleneimine-cobalt complex, terpene compounds, the reaction product of amino acids with a hydroxyl group-containing reductive substance and triphenylmethyl compounds; as polymer oxygen absorbents, the coordination bonded bodies of a nitrogen-containing resin with transition metal (for example, a combination of MXD Nylon with cobalt), the blend product of a tertiary hydrogen-containing resin with transition metal (for example, a combination of polypropylene with cobalt), the blend product of a carbon-carbon unsaturated bond-containing resin with transition metal (for example, a combination of polybutadiene with cobalt), photo oxidation degradative resin (example; polyketone), anthraquinone polymer (example, polyvinylanthraquinone) and the like. Further, a photo initiator (benzophenone and the like), a peroxide catching agent (a commercially available antioxidant and the like) and a deodorant (active carbon and the like) are preferably added to these compositions.

The biaxially stretch blow bottle of the present invention is useful as containers for seasoning agents such as soy, sauce, ketchup, mayonnaise and dressing; fermented foods such as soybean paste and vinegar; oil and fat foods such as salad oil; sakes such as refined sake, beer, sweet sake, whisky, distilled spirit and wine; cold beverages such as carbonated beverage, juice, sport drink, milk, coffee beverage, oolong tea, black tea and mineral water; toilet goods; pharmaceuticals; detergents; cosmetics; industrial chemicals; pesticides and the like in addition to general foods, but is useful in particular for uses for the containers of beverages such as beer, wine, carbonated beverage, juice, tea, milk and coffee beverage; seasoning agents such as sauce and dressing.

The fuel container of the present invention comprises EVOH of the present invention. The process for preparing the fuel container of the present invention is not particularly limited, but includes a method of vacuum-molding a multilayer sheet obtained by co-extruding EVOH and the thermoplastic resin; a method of vacuum-molding a laminate sheet obtained by co-extruding and laminating the EVOH/the thermoplastic resin on a thermoplastic resin film; a method of vacuum-molding a multilayer sheet obtained by dry-laminating the EVOH film and thermoplastic resin film using an adhesive; and the like, in addition to a method of providing EVOH of the present invention and the thermoplastic resin to an injection molding machine, a direct blow molding machine (continuous type, accumulator type), an injection blow molding machine and the like to directly obtain the fuel container of the present invention. Blow molding methods such as direct blow and injection blow are preferably adopted. For example, the fuel container of the present invention is obtained by sandwiching a parison obtained by co-extruding the EVOH composition and the thermoplastic resin with a mold and blowing air to carry out blow molding.

For example, when the thermoplastic resin layer is made as both outer layers and the EVOH layer is referred to as a and the thermoplastic resin layer is referred to as b, the fuel container of the present invention can take not only the layer structure of b/a/b, but also b/a/b/a/b and the like. Further, when a regrind layer comprising a mixture (regenerated product of scrap) of at least EVOH and the thermoplastic resin is referred to as R, b/R/a/b, b/R/a/R/b, b/a/R/a/b, b/R/a/R/a/R/b and the like are also possible. The layer structures of b/a/b, b/R/a/b and b/R/a/R/a/b are preferably adopted, and a mixture used for the regrind layer and the adhesive resin described later can be also compounded for the layer structure of b if necessary. Further, in these laminates, an adhesive resin is used at respective interlayers if necessary. In particular, it is preferable that the lamination composition comprises b/R/adhesive resin layer/a/adhesive resin layer/b because the gas barrier property of fuel, the strength of a fuel container and economical efficiency at producing the fuel container are superior.

As the adhesive resin, a modified olefin polymer containing carboxyl groups obtained by chemically bonding unsaturated carboxylic acid or its anhydride with an olefin polymer by addition reaction and graft reaction can be mentioned. Specifically, there can be preferably mentioned the mixture of one or two or more of polymers selected from maleic anhydride graft modified polyethylene, maleic anhydride graft modified polypropylene, maleic anhydride graft modified ethylene-propylene (block or random) copolymer, maleic anhydride graft modified ethylene-ethyl acrylate copolymer, maleic anhydride graft modified ethylene-vinyl acetate copolymer and the like. The amount of unsaturated carboxylic acid or its anhydride contained in the olefin polymer is preferably 0.001 to 3% by weight (further, 0.01 to 1% by weight and in particular, 0.03 to 0.5% by weight). When the modified amount in the modified olefin polymer is little, interlayer adhesiveness, moldability and impact resistance are occasionally inadequate, and to the contrary, when it is much, crosslinking reaction occurs and it is not preferable because moldability is occasionally deteriorated. The EVOH of the present invention, other EVOH, rubber elastomer components such as polyisobutylene and an ethylene-propylene rubber, further, other thermoplastic resin and the like can be blended with these acid modified olefin polymers. In particular, the adhesiveness is occasionally improved by blending an olefin polymer different from the olefin polymer being the main component of the acid modified olefin polymer and it is useful.

The thicknesses of the respective layers are not categorically mentioned depending on uses, container mode, physical properties requested and the like, but for example, when it is used for the tank for fuel of an automobile, the a is 30 to 500 µm (further, 50 to 400 µm and in particular 80 to 300 µm), the b is about 100 to 10000 µm (further, 200 to 5000 µm and in particular 300 to 3000 µm), the regrind layer is 100 to 10000 µm (further, 200 to 5000 µm and in particular 300 to 3000 µm), the adhesive resin layer is about 30 to 500 µm (further, 50 to 400 µm and in particular 80 to 300 µm) and the total thickness of the fuel container is about 300 to 10000 µm (further, 1000 to 8000 µm and in particular 2000 to 6000 µm). In particular, it is preferable that the a (the EVOH composition layer) is situated at 20 to 60% (further 25 to 55% and in particular 30 to 45%) from the inside to the outside to the thickness direction of the fuel container because the barrier property of fuel, crack resistance at static deformation, interlayer adhesiveness for a long period and the like are further superior. Further, the thickness of the EVOH containing layer is preferably 1 to 20% of the total layer thickness. When the thickness is less than 1%, the barrier property of fuel is insufficient and when it exceeds 20%, it is not preferable because the strength of the fuel container tends to be lowered.

The fuel container of the present invention is extremely superior in the barrier property and the stability of quality for fuel, in particular for fuel compounding an oxygen atom-containing compound and is useful as various containers such as fuel containers that are mounted on the tank for fuel of gasoline and the like of an automobile, an autobicycle, a ship, an air plane, a power generator and instrument for industry and for agriculture; mobile containers for supplying fuel; further, bottles, tanks and drums for transport, preservation and storage. Fuel includes gasoline, in particular, gasoline in which oxygen element containing compounds such as methyl alcohol, ethyl alcohol, methyl tert-butyl ether (MTBE) is compounded, additionally, heavy oil, light oil, kerosene and other fuel.

Further, the multilayer shrink film of the present invention comprises a layer comprising EVOH of the present invention and other substrate layer that is laminated on the one side or both side of the layer. The multilayer shrink film is produced by stretching the laminate (by heating). The production method is not particularly limited, but the example includes a method of melt-extruding and laminating other substrate on the film and sheet of EVOH; to the contrary, a method of melt-extruding and laminating the resin on other substrate; a method of co-extruding the resin and other substrate; a method of dry-laminating the resin (layer) and other substrate (layer) using known adhesives such as an organotitanium compound, an isocyanate compound, a polyester compound and a polyurethane compound; and the like. Among these, the method of co-extrusion is preferable because stretching property and shrink property are good as a laminate.

As the co-extrusion method, specifically, known methods such as a multi manifold die method, a feed block method, a multi slot die method and a die external adhesion method can be adopted. As the shape of dice, a T-dice and a round dice can be used and the melt molding temperature at the melt extrusion is preferably 150 to 300° C.

As the other substrate, a thermoplastic resin is useful and the specific example includes broad polyolefin resins such as the homo- or copolymers of olefin such as linear low density polyethylene, low density polyethylene, very low density polyethylene, middle density polyethylene, high density polyethylene, an ethylene-vinyl acetate copolymer, an ionomer, an ethylene-propylene (block and random) copolymer, an ethylene-acrylic acid copolymer, an ethylene-acrylate copolymer, polypropylene, propylene-α-olefin (α-olefin having 4 to 20 carbon atoms) copolymer, polybutene and polypentene; or polymers modified by grafting unsaturated carboxylic acid or its ester with these homo- or copolymers of olefin, a polyester resin, a polyamide resin (also including copolymerization polyamide), polyvinyl chloride, polyvinylidene chloride, an acryl resin, polystyrene, a vinyl ester resin, a polyester elastomer, a polyurethane elastomer, chlorinated polyethylene, chlorinated polypropylene, aromatic or aliphatic polyketone, polyalcohols obtained by reducing these, additionally, other EVOH, etc. Polyolefins such as polyethylene, polypropylene, an ethylene-propylene (block and random) copolymer and an ethylene-vinyl acetate copolymer; polyamide; polystyrene; polyesters such as polyethylene terephthalate (PET) and polyethylene naphthalate (PEN) are preferably used from the points of the physical properties (in particular, strength) of laminates.

Further, when other substrate is coated by extrusion on the molded articles such as films and sheets of the multilayer shrink film of the present invention and the films and sheets of other substrate are laminated using an adhesive, arbitrary substrates (paper, metal foil, uniaxially or biaxially stretch plastic film or sheet and an article deposited with an inorganic substance, fabric, non woven fabric, metal cotton, wooden article and the like) other than the fore-mentioned thermoplastic resin can be used as the other substrate.

As the layer composition of the multilayer shrink film of the present invention, when the EVOH containing layer is referred to as a ($a_1$, $a_2$, . . . ) and other substrate, for example, a thermoplastic resin-containing layer is referred to as b ($b_1$, $b_2$, . . . ), not only the double layer structure of a/b but also arbitrary combinations such as b/a/b, a/b/a, $a_1/a_2/b$, $a/b_1/b_2$, $b_2/b_1/a/b_1/b_2$ and $b_2/b_1/a/b_1/a/b_1/b_2$ are possible for films and sheet shape. Further, when a regrind layer comprising a mixture of at least the EVOH composition and the thermoplastic resin is referred to as R, b/R/a, b/R/a/b, b/R/a/R/b, b/a/R/a/b, b/R/a/R/a/R/b and the like are also possible. Arbitrary combinations such as bimetal type for a, b, a core (a)-sheath (b) type, a core (b)-sheath (a) type or eccentric core sheath type are possible for filament shape. Further, in the above layer composition, a laminate superior in stretching property can be obtained by providing an adhesive resin layer at respective interlayers if necessary. As the adhesive resin, various resins can be used and it differs depending on the kind of the resin of b, which cannot be categorically mentioned. However, a modified olefin polymer containing carboxyl groups obtained by chemically bonding unsaturated carboxylic acid or its anhydride with an olefin polymer (the above-mentioned broad polyolefin resin) by addition reaction and graft reaction can be mentioned. Specifically, there can be preferably mentioned the mixture of one or two or more of polymers selected from maleic anhydride graft modified polyethylene, maleic anhydride graft modified polypropylene, maleic anhydride graft modified ethylene-propylene (block or random) copolymer, maleic anhydride graft modified ethylene-ethyl acrylate copolymer, maleic anhydride graft modified ethylene-vinyl acetate copolymer and the like. At this time, the amount of unsaturated carboxylic acid or its anhydride contained in the thermoplastic resin is preferably 0.001 to 3% by weight, more preferably 0.01 to 1% by weight and preferably 0.03 to 0.5% by weight in particular. When the modified amount in the modified product is little, adhesiveness is occasionally inadequate, and to the contrary, when it is much, crosslinking reaction occurs and it is not preferable because moldability is occasionally deteriorated. The EVOH composition of the present invention, other EVOH, rubber elastomer components such as polyisobutylene and ethylene-propylene rubber and further, the resin of the b layer and the like can be blended with these adhesive resins. In particular, the adhesiveness is occasionally improved by blending a polyolefin resin different from the polyolefin resin being the main component of the adhesive resin and it is useful.

The thicknesses of the respective layers of the laminate used for producing the multilayer shrink film of the present invention are not categorically mentioned depending on the layer composition, the kind of b, uses, packaging mode, physical properties requested and the like, but the layer a is usually selected from a range of about 2 to 500 μm (further, 3 to 200 μm), the layer b is selected from a range of about 10 to 5000 μm (further, 30 to 1000 μm), and the adhesive resin layer is usually selected from a range of about 1 to 400 μm (further, 2 to 150 μm).

Further, the substrate resin layer may contain an antioxidant, an antistatic agent, a lubricant, a nuclear material, an antiblocking agent, an ultraviolet absorbent, wax and the like.

(Heating) stretching treatment is usually carried out for imparting shrink property to the above laminate (multilayer film). The (heating) stretching treatment means operation by which a film or sheet laminate uniformly heated thermally is uniformly molded to a tube and a film shape by a chuck, a plug, vacuum force, pneumatic force, blow and the like. The stretching may be either of uniaxial stretching or biaxial stretching, and a multilayer stretch film that has good physical properties, does not generate pin holes, crack, stretching unevenness and uneven thickness and is superior in the gas barrier property is obtained by carrying out the stretching at magnification as high as possible (vertically and/or horizontally about 1.5 to 9 times).

As the stretching method, there can be adopted a molding method having high stretching magnification among a roll stretching method, a tenter stretching method, a tubular stretching method, a stretch blow method, a vacuum pneumatic molding and the like. In case of the biaxial stretching, either of a simultaneous biaxial stretching system and a successive biaxial stretching system can be adopted. The stretching temperature is selected from a range of about 40 to 140° C. and preferably about 60 to 100° C. When the stretching temperature is less than 40° C., stretching property is bad and when it exceeds 140° C., thermal shrinkage is inadequate. It is preferable that the thermoplastic resin layer, in particular, the polyolefin resin layer is crosslinked in advance of the stretching by irradiating radiation, electron beam, ultraviolet rays and the like on the laminate of whole cloth because the stretching property of the whole cloth is improved and the mechanical strength of a product is improved.

When the multilayer shrink film of the present invention is used for shrink packaging uses such as raw meat, processed meat, cheese and the like, the raw meat, processed meat, cheese and the like are store in a bag comprising the film, then air in the bag is removed under reduced pressure, the opening of the bag is closed, thermal treatment at 50 to 130° C. and preferably 70 to 120° C. for 2 to 300 seconds is carried out, the film is thermally shrunk and adhering packaging is carried out to content articles. A packaging article superior in appearance can be obtained by the operation procedure. The inside of the package is replaced with carbon dioxide, nitrogen gas and the like to be able to be packed. Further, the multilayer shrink film of the present invention can be also preferably used for so-called stretch shrink packaging by which a product mounted on a tray is packed by thermal shrinkage.

On the other hand, when the multilayer shrink film of the present invention is used for skin pack packaging use, an unstretch multilayer film (laminate) is charged in a skin pack packing machine, the film is stretched at 60 to 200° C. and occasionally molded thermally by a mold, then it is immediately covered on a substrate film, sheet and tray on which the content article is placed, its surrounding is closely sealed, then it returns to atmospheric pressure to be shrunk and the content article and its surrounding film are closely contacted. A packaging article superior in appearance can be obtained by the operation procedure. It is also preferable in the skin pack packaging use that the thermoplastic resin-layer, in particular, the polyolefin resin layer is crosslinked by irradiating radiation, electron beam, ultraviolet rays and the like on the multilayer film of whole cloth because the stretching property of the whole cloth is improved and the mechanical strength of a product is improved.

The multilayer shrink film of the present invention is very useful for the shrink packaging uses or the skin pack packaging use of raw meat, processed meat, cheese and the like as described above, but additionally, it is useful as various gas barrier packaging uses of pharmaceuticals, industrial chemicals, pesticides, electronic parts, mechanical parts and the like.

Hereinafter, the present invention is described in detail based on Examples. In Examples, "%" represent weight standards unless indicated otherwise.

Example 1

Into a 1 $m^3$ polymerization reactor having a cooling coil, 500 kg of vinyl acetate, 100 kg of methanol, 500 ppm (based on vinyl acetate) of acetyl peroxide, 20 ppm (based on vinyl acetate) of citric acid and 14 kg of 3,4-diacetoxy-1-butene were charged, the system was replaced once with nitrogen gas and then, replaced with ethylene and ethylene was pressurized to 35 kg/$cm^2$. While stirring, temperature was raised to 67° C. and polymerization was carried out for 6 hours until polymerization rate was 50% while adding the total amount of 4.5 kg of 3,4-diacetoxy-1-butene at 15 g/min Then, the polymerization reaction was stopped to obtain an ethylene-vinyl acetate copolymer with an ethylene content of 29% by mol.

The methanol solution of the ethylene-vinyl acetate copolymer was fed at a speed of 10 kg/hr from the tower top portion of a shelf stage tower (hydrolyzing tower) and methanol solution containing 0.012 equivalent of sodium hydroxide based on the residual acetic acid group in the copolymer was simultaneously fed from the tower top portion. On the other hand, methanol was fed at 15 kg/hr from the tower lower portion. Temperature in the tower was 100 to 110° C. and the pressure of the tower was 3 kg/cm²G. The methanol solution (30% of EVOH and 70% of methanol) of EVOH containing a structural unit having 1,2-glycol bond was taken out from 30 minutes after start of the charging. The hydrolyzing degree of a vinyl acetate component of EVOH was 99.5% by mol.

Then, the methanol solution of the obtained EVOH was fed at 10 kg/hr from the tower top portion of a methanol/aqueous solution preparation tower, methanol vapor at 120° C. and water vapor were respectively charged at 4 kg/hr and 2.5 kg/hr from the tower lower portion, methanol was distilled off at 8 kg/hr from the tower top portion, and 6 equivalent of methyl acetate based on the amount of sodium hydroxide used in the hydrolysis was simultaneously from the tower middle portion of the tower with a inner tower temperature of 95 to 110° C. to obtain the water/alcohol solution of EVOH (a resin concentration of 35%) from the tower bottom portion.

The water/alcohol solution of the obtained EVOH was extruded in a strand shape from a nozzle with a hole diameter of 4 mm in a coagulation solution vessel kept at 5° C. that comprises 5% of methanol and 95% of water and the strand shape article was cut with a cutter after completion of the coagulation to obtain the porous pellets of EVOH with a diameter of 3.8 mm, a length of 4 mm and a moisture content of 45%.

After the porous pellets were rinsed with water so that water was 100 parts based on 100 parts of the porous pellets, they were charged into mix solution containing 0.032% of boric acid and 0.007% of calcium dihydrogen phosphoric acid and the mixture was stirred at 30° C. for 5 hours. The porous pellets were dried for 12 hours by passing nitrogen gas with a moisture content of 0.6% and a temperature of 70° C. in a batch type aeration box drier, the moisture content was reduced to 30%, and then the pellets were dried for 12 hours with nitrogen gas with a moisture content of 0.5% and a temperature of 120° C. using a batch type tower fluidized bed drier to obtain pellets with the objective EVOH composition. The pellets contained boric acid and calcium dihydrogen phosphoric acid by 0.015 part (converted to boron) and 0.005 part (converted to phosphate radical) respectively based on 100 parts of EVOH. Further, the MFR of EVOH was 3.5 g/10 min (measured at 210° C. and 2160 g).

Further, the introduction amount of the structural unit (1) in the above EVOH was calculated by measuring the ethylene-vinyl acetate copolymer before hydrolysis with ¹H-NMR (internal standard substance: tetramethylsilane and solvent: d6-DMSO). The ethylene-vinyl acetate copolymer before hydrolysis had the following structure and the introduction amount calculated from the measurement result was 2.5% by mol (refer to FIG. 1). Further, "AVANCE DPX400" manufactured by Bruker Japan Co., Ltd. was used for NMR measurement.

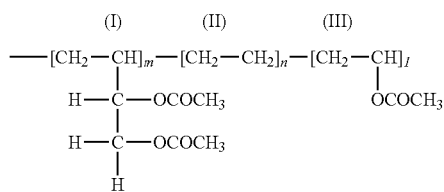

[Measurement Result]
1.0 to 1.8 ppm: Methylene proton (integration value a of FIG. 1)
1.87 to 2.0 ppm: Methyl proton
3.95 to 4.3 ppm: Proton at the methylene side of the structure (I)+proton of unreacted 3,4-diacetoxy-1-butene (integration value b of FIG. 1)
4.6 to 5.1 ppm: Methine proton+proton at the methine side of the structure (I) (integration value c of FIG. 1)
5.2 to 5.9 ppm; Proton of unreacted 3,4-diacetoxy-1-butene (integration value d of FIG. 1)

[Calculation Method]

Since 4 protons exist at 5.2 to 5.9 ppm, the integration value of one proton is d/4. Since the integration value b is an integration value in which the protons of diol and a monomer are included, the integration value (A) of one proton of the diol is $A=(b-d/2)/2$. Since the integration value c is an integration value in which the protons of vinyl acetate side and diol side are included, the integration value (B) of one proton of vinyl acetate is $B=1-(b-d/2)/2$. Since the integration value a is an integration value in which ethylene and methylene are included, the integration value (C) of one proton of ethylene is calculated as $C=(a-2\times A-2\times B)/4=(a-2)/4$. The introduction amount of the structural unit (1) was calculated from $100\times\{A/(A+B+C)\}=100\times(2\times b-d)/(a+2)$.

Figure 2:
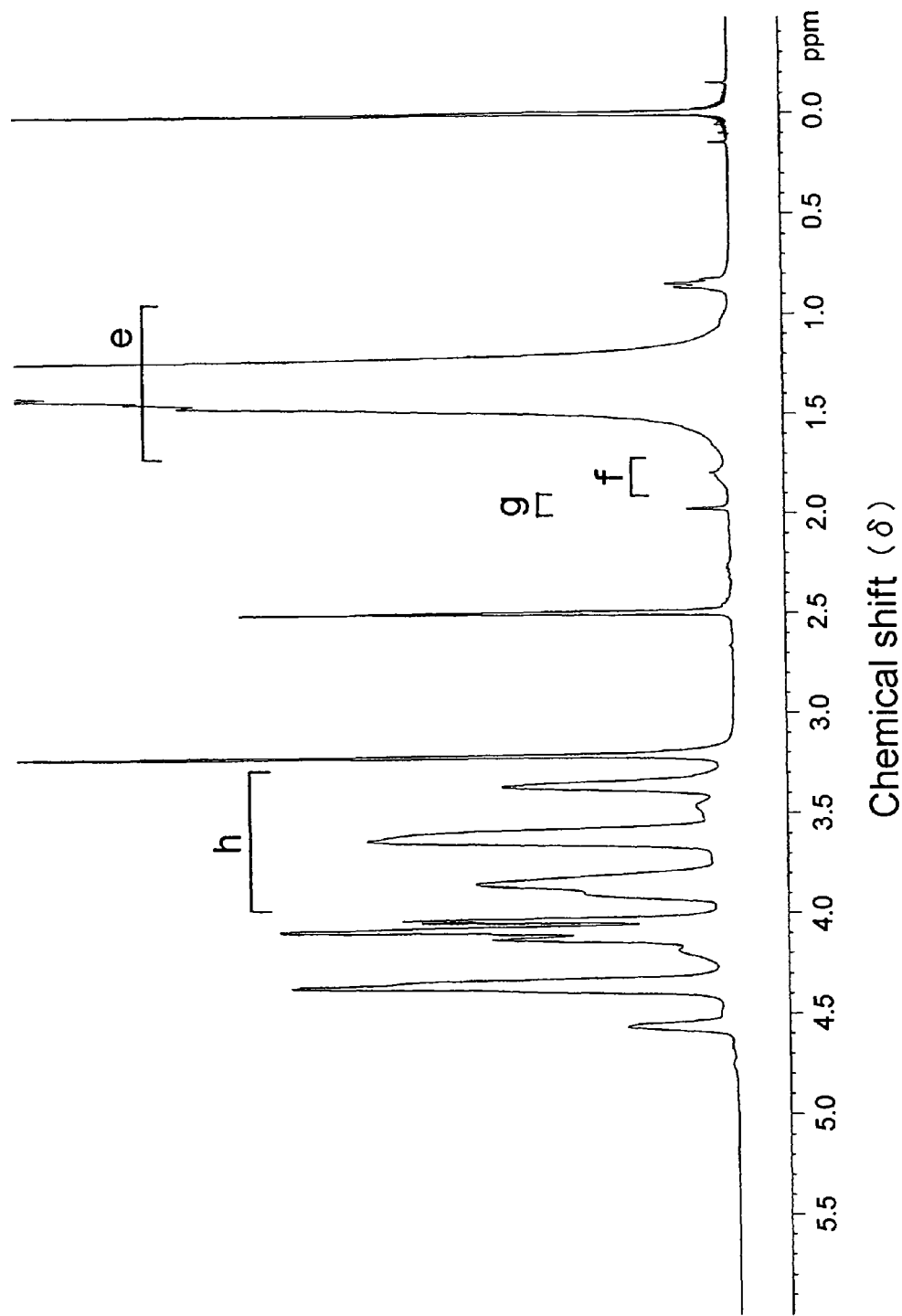
FIG. 2 is a $^1$H-NMR chart of EVOH obtained in Example 1.

Further, FIG. 2 shows the result in which ¹H-NMR measurement was also carried out similarly with respect to EVOH after hydrolysis. Since a peak corresponding to methyl proton at 1.87 to 2.06 ppm is greatly decreased, it is clear that 3,4-diacetoxy-1-butene copolymerized was also hydrolyzed and 1,2-glycol structure is formed.

The pellets (EVOH composition) obtained in the above-description were fed to a multilayer extruder equipped with a multilayer T die having 3 kinds and 5 layers of feed block to obtain a multilayer sheet having the layer composition (thickness; 450/90/120/90/450 μm) of polystyrene ("DIALEX HT516" manufactured by A & M Styrene Co., Ltd.) layer/adhesive resin ("MODIC AP F502" manufactured by Mitsubishi Chemical Corp.) layer/EVOH layer/adhesive resin layer (same as the left)/polystyrene layer (same as the left). Then, the thermal stretching molding processing of a cup (an upper face of 60 mmφ, a bottom face of 55 mmφ, a depth of 150 mm and a drawing ratio of about 2.5) was carried out at a heater temperature of 500° C. for a heating time of 28 seconds by a plug assist type vacuum pneumatic molding machine (manufactured by Asano Laboratories Co., Ltd.) to prepare a multilayer container and the appearance, barrier properties and strength are evaluated by following method.

(Appearance)

The obtained cup is visually observed and evaluated in the following manner.

◯ . . . Streak and haze are not observed at the side face of a container and it is uniformly stretched.

Δ . . . Haze is observed at the side face of a container and stretching is not uniform.

X . . . Streak is observed at the side face of a container and crack is generated on the EVOH layer.

(Gas Barrier Property)

Oxygen transmission rate (cc/day) per one container is measured under conditions of a temperature of 23°, humidity in a container of 100% RH, humidity out of a container of 50% and 100% Oxygen using an oxygen transmission rate measurement system ("OXTRAN10/50" manufactured by MOCON Inc.).

(Strength)

A container stands on a horizontal table, a plate is placed on the upper portion of the container, a load is gradually applied over the plate with a compression test system and a load (buckling load) by which the container is greatly deformed is measured. The measurement value is the average value of 5 samples.

Example 2

EVOH having the introduction amount of a structural unit having 1,2-glycol bond at a side chain of 3.0% by mol was obtained in the same manner as in Example 1 except that polymerization was carried out while adding 210 ppm (based on vinyl acetate) of t-butylperoxy neodecanoate over 5 hours in place of acetyl peroxide and while adding the total amount of 8 kg of 3,4-diacetoxy-1-butene at 26 g/min. Then, treatment was similarly carried out to obtain an EVOH composition and evaluation was carried out. Further, MFR of the EVOH composition was 3.7 g/10 min.

Example 3

EVOH having the introduction amount of a structural unit having 1,2-glycol bond at a side chain of 4.5% by mol was obtained in the same manner as in Example 2 except that the total amount of 19 kg of 3,4-diacetoxy-1-butene was added at an addition speed of 63 g/min. Then, treatment was similarly carried out to obtain an EVOH composition and evaluation was carried out. Further, MFR of the EVOH composition was 4.0 g/10 min.

Example 4

By the same method as Example 1, initial charging was set as 400 kg of vinyl acetate, 120 kg of methanol, 150 ppm (based on vinyl acetate) of acetyl peroxide, 20 ppm (based on vinyl acetate) of citric acid and 15 kg of 3,4-diacetoxy-1-butene, the pressure of ethylene was set as 30 kg/cm$^2$, and polymerization was carried out while adding the total amount of 5.0 kg of 3,4-diacetoxy-1-butene at 15 g/min, to obtain an ethylene-vinyl acetate copolymer having an ethylene content of 26% by mol. This was hydrolyzed in same manner as Example 1 to obtain EVOH having the hydrolysis degree of 99.5% by mol. Further, the porous pellets of EVOH were obtained by the same method as Example 1. After the pellets were rinsed with water, they were stirred in aqueous mix solution containing 0.032% of boric acid and 0.007% of calcium dihydrogen phosphoric acid and the mixture was dried to obtain the pellets of the EVOH composition in which the introduction amount of a structural unit having 1,2-glycol bond at a side chain was 2.5% by mol, MFR was 3.2 g/10 min, the content of boric acid was 0.013 part (converted to boron) and the content of calcium dihydrogen phosphate was 0.006 part (converted to phosphate radical). The EVOH composition was evaluated in the same manner as Example 1.

Example 5

EVOH (A1), in which ethylene content was 38% by mol and the introduction amount of a structural unit having 1,2-glycol bond at a side chain was 2.5% by mol, was obtained in the same manner as in Example 1 except that the amount of methanol at initial charging was set as 35 kg and ethylene pressure was set as 45 kg/cm$^2$. Evaluation was similarly carried out. Further, MFR was 4.0 g/10 min. Treatment was carried out so that the EVOH composition contained boric acid and calcium dihydrogen phosphate by 0.015 part (converted to boron) and 0.005 part (converted to phosphate radical) respectively.

Example 6

EVOH (A2), in which ethylene content was 38% by mol and the introduction amount of a structural unit having 1,2-glycol bond at a side chain was 2.0% by mol, was obtained in the same manner as in Example 5 except that a mixture (70:20:10) of 3,4-diacetoxy-1-butene, 3-acetoxy-4-ol-1-butene and 1,4-diacetoxy-1-butene was used in place of 3,4-diacetoxy-1-butene. Evaluation was similarly carried out. Further, MFR of the EVOH composition was 3.7 g/10 min. Treatment was carried out so that the EVOH composition contained boric acid and calcium dihydrogen phosphate by 0.015 part (converted to boron) and 0.005 part (converted to phosphate radical) respectively.

Example 7

By the same method as Example 1, initial charging was set as 500 kg of vinyl acetate, 20 kg of methanol, 500 ppm (based on vinyl acetate) of acetyl peroxide, 20 ppm (based on vinyl acetate) of citric acid and 30 kg of 3,4-diacetoxy-1-butene, the pressure of ethylene was set as 60 kg/cm$^2$, and polymerization was carried out while adding the total amount of 10.0 kg of 3,4-diacetoxy-1-butene at 15 g/min, to obtain an ethylene-vinyl acetate copolymer with an ethylene content of 48% by mol. This was hydrolyzed in the same manner as Example 1 to obtain EVOH with the hydrolysis degree of 99.5% by mol. Further, the porous pellets of EVOH were obtained by the same method as Example 1. After the pellets were rinsed with water, they were stirred in aqueous mix solution containing 0.032% of boric acid and 0.007% of calcium dihydrogen phosphoric acid and the mixture was dried to obtain the pellets of the EVOH composition in which the introduction amount of a structural unit having 1,2-glycol bond at a side chain was 2.5% by mol, MFR was 3.8 g/10 min, the content of boric acid was 0.015 part (converted to boron) and the content of phosphoric acid was 0.005 part (converted to phosphate radical). The EVOH composition was evaluated in the same manner as Example 1.

Example 8

By the same method as Example 1, initial charging was set as 400 kg of vinyl acetate, 120 kg of methanol, 155 ppm (based on vinyl acetate) of acetyl peroxide, 20 ppm (based on vinyl acetate) of citric acid and 45 kg of 3,4-diacetoxy-1-butene, the pressure of ethylene was set as 30 kg/cm$^2$, and polymerization was carried out while adding the total amount of 15.0 kg of 3,4-diacetoxy-1-butene at 45 g/min, to obtain an ethylene-vinyl acetate copolymer with an ethylene content of 29% by mol. This was hydrolyzed in the same manner as Example 1 to obtain EVOH with the hydrolysis degree of 99.5% by mol. Further, the porous pellets of EVOH were obtained by the same method as Example 1. After the pellets were rinsed with water, they were stirred in aqueous mix solution containing 0.030% of boric acid and 0.010% of calcium dihydrogen phosphoric acid and the mixture was dried to obtain the pellets of the EVOH composition in which the introduction amount of a structural unit having 1,2-glycol bond at a side chain was 10.1% by mol, MFR was 4.2 g/10 min, the content of boric acid was 0.014 part (converted to boron) and the content of phosphoric acid was 0.007 part (converted to phosphate radical). Further, the pellets and EVOH not having 1,2-glycol bond at a side chain in which an ethylene content was 29% by mol and MFR was 3.2 g/10 min were melt-kneaded at a weight ratio of 1/4 to obtain the EVOH composition and it was similarly evaluated. The average introduction amount of a structural unit having 1,2-glycol bond was 2.0% by mol at that time.

Example 9

By the same method as Example 1, initial charging was set as 500 kg of vinyl acetate, 80 kg of methanol, 155 ppm (based on vinyl acetate) of acetyl peroxide, 20 ppm (based on vinyl acetate) of citric acid and 45 kg of 3,4-diacetoxy-1-butene, the pressure of ethylene was set as 30 kg/cm$^2$, and polymerization was carried out while adding the total amount of 5.0 kg of 3,4-diacetoxy-1-butene at 15 g/min, to obtain an ethylene-vinyl acetate copolymer with an ethylene content of 29% by mol. This was hydrolyzed in the same manner as Example 1 to obtain EVOH with the hydrolysis degree of 99.5% by mol. Further, the porous pellets of EVOH were obtained by the same method as Example 1. After the pellets were rinsed with water, they were stirred in aqueous mix solution not containing boric acid and containing 0.010% of calcium dihydrogen phosphoric acid and the mixture was dried to obtain the pellets of the EVOH composition in which the introduction amount of a structural unit having 1,2-glycol bond was 2.5% by mol, MFR was 3.5 g/10 min, the content of phosphoric acid was 0.007 part (converted to phosphate radical). The EVOH composition was evaluated in the same manner as Example 1.

Example 10

Polymerization reaction was carried out under the same condition as Example 5 to obtain an ethylene-vinyl acetate copolymer with an ethylene content of 38% by mol. The methanol solution of the ethylene-vinyl acetate copolymer was fed at a speed of 7 kg/hr from the tower top portion of a shelf stage tower (hydrolyzing tower) and methanol solution containing 0.008 equivalent of sodium hydroxide for the residual acetic acid group in the copolymer was simultaneously fed from the tower top portion. On the other hand, methanol was fed at 15 kg/hr from the tower lower portion. Temperature in the tower was 100 to 110° C. and the pressure of the tower was 3 kg/cm$^2$G. The methanol solution (30% of EVOH and 70% of methanol) of EVOH containing a structural unit having 1,2-glycol bond was taken out from 30 minutes after start of the charging. The hydrolysis degree of a vinyl acetate component of EVOH was 98.0% by mol. Operation thereafter was carried out in the same manner as Example 1 to obtain the pellets of the EVOH composition in which the introduction amount of a structural unit having 1,2-glycol bond was 2.5% by mol, MFR was 3.7 g/10 min, the content of boric acid was 0.015 part (converted to boron) and the content of phosphoric acid was 0.007 part (converted to phosphate radical). It was confirmed that all of the residual acetyl group of unhydrolyzed portion was base on vinyl acetate monomer and those based on 3,4-diacetoxy-1-butene do not exist. The EVOH composition was evaluated in the same manner as Example 1.

Comparative Example 1

EVOH composition not having 1,2-glycol bond in which an ethylene content was 29% by mol, MFR was 3.7 g/10 min, the content of boric acid was 0.015 part (converted to boron) and the content of calcium dihydrogen phosphate was 0.005 part (converted to phosphate radical) was obtained without adding 3,4-diacetoxy-1-butene in Example 1 and evaluation was similarly carried out.

The evaluation results of Examples 1 to 10 and Comparative Example 1 are collectively shown in Table 1.

TABLE 1

|  | Appearance | Gas barrier property* | Strength (kg) |
|---|---|---|---|
| Example 1 | ◯ | 0.062 | 22 |
| Example 2 | ◯ | 0.089 | 20 |
| Example 3 | ◯ | 0.180 | 19 |
| Example 4 | ◯ | 0.040 | 20 |
| Example 5 | ◯ | 0.113 | 22 |
| Example 6 | ◯ | 0.110 | 21 |
| Example 7 | ◯ | 0.312 | 26 |
| Example 8 | ◯ | 0.071 | 20 |
| Example 9 | ◯ | 0.060 | 20 |
| Example 10 | ◯ | 0.254 | 26 |
| Com. Ex. 1 | X | ** | 2 |

*cc/Cup · day
** Since a value exceeded the upper limit, measurement was impossible.

Polymerization Example 1

The EVOH composition (A3) was obtained by the following method.

EVOH composition, in which an ethylene content was 38% by mol, the hydrolysis degree was 99.5% by mol, the content of calcium dihydrogen phosphate was 0.005 part (converted to phosphate radical), the introduction amount of a structural unit having 1,2-glycol bond at a side chain was 2.5% by mol and MFR was 5.2 g/10 min, was obtained in the same manner as Example 5 except that the charge amount of methanol was set as 20 kg, 210 ppm (based on vinyl acetate) of t-butylperoxy neodecanoate was added over 5 hours in place of acetyl peroxide, polymerization was carried out while adding total amount of 4.5 kg of 3,4-diacetoxy-1-butene at 15 g/min and boric acid was not added.

Further, separately, the under-mentioned EVOH compositions not containing a structural unit having 1,2-glycol bond were obtained.

EVOH composition (B1): an ethylene content was 38% by mol, the hydrolysis degree was 99.5% by mol, the content of boric acid was 0.015 part by weight (converted to boron), the content of calcium dihydrogen phosphate was 0.005 part by weight (converted to phosphate radical) and MFR was 3.2 g/10 min.

EVOH composition (B2): an ethylene content was 32% by mol, the hydrolysis degree was 99.5% by mol, the content of boric acid was 0.015 part by weight (converted to boron), the content of calcium dihydrogen phosphate was 0.005 part by weight (converted to phosphate radical) and MFR was 3.2 g/10 min.

EVOH composition (B3): an ethylene content was 44% by mol, the hydrolysis degree was 97.0% by mol, the content of boric acid was 0.012 part by weight (converted to boron), the content of calcium dihydrogen phosphate was 0.005 part by weight (converted to phosphate radical) and MFR was 3.2 g/10 min.

Example 11

Multilayer parison with the 2 species and 3 layers of thermoplastic polyester resin layer/EVOH layer/thermoplastic polyester resin layer (thickness composition: [inside] 2.1/0.15/2.1 (mm) [outside], outer diameter: 22 mm, and height: 110 mm) was prepared by co-injection molding with an injection molding machine (manufactured by ARBURG GmbH.) having a multilayer manifold system (manufactured by KORTEC Inc.), using the EVOH composition (A1) pellets obtained in Example 5 and a thermoplastic polyester resin (polyethylene terephthalate; "BK2180" manufactured by Japan Unipet Co., Ltd.). After the obtained multilayer parison was stored at room temperature for one day, the multilayer parison was preliminarily heated with an infrared ray heater while being rotated and successively, successive biaxial stretch blow molding was carried out to a vertical direction and a horizontal direction, using a biaxial stretch blow molding machine (manufactured by Groupe SIDEL), to obtain a multilayer bottle with an inner volume of 500 cc (the outer diameter of body portion: 65 mm and height: 250 mm).

Other main molding conditions were as below.
Plasticization temperature of EVOH: 190 to 200° C.
Plasticization temperature of thermoplastic polyester resin: 275 to 280° C.
Temperature of multilayer manifold system portion: 275° C.
Mold cooling temperature: 10° C.
EVOH injection pressure: 87.5 Mpa.
thermoplastic polyester resin injection pressure: 60 Mpa.
Heating temperature of multilayer parison: 110° C.
Blow air pressure: 3.8 MPa The thickness composition of layers at the bottle body potion of the multilayer bottle obtained was [inside] thermoplastic polyester resin/EVOH/thermoplastic polyester resin [outside]=150/15/200 (μm).

Evaluation below was carried out for the obtained bottle.
(Impact Delamination Resistance)

Water (about 500 cc) was filled in a bottle, its mouth portion was sealed with a cap and when it was repeatedly dropped ten times on floor face made of steel respectively while letting the body portion horizontal, the situation of delamination was visually observed and evaluated as below.
◉ . . . Delamination was not confirmed at all.
○ . . . Delamination was slightly confirmed.
Δ . . . Delamination was confirmed a little.
x . . . Remarkable delamination was confirmed.
(Transparency)

A paper on which two lines with a width of 0.8 mm and intervals of 0.5 mm, 1.0 mm, 1.5 mm, 2.0 mm and 2.5 mm is paved under the bottle and when a bottom portion is viewed from the mouth portion, the minimum interval by which two lines are clearly viewed is confirmed and it is evaluated as transparency.
(Oxygen Transmission)

Oxygen transmission rate (cc/day) per one bottle is measured under conditions of a temperature of 23°, humidity in a bottle of 100% RH and humidity out of a bottle of 50% using an oxygen transmission rate measurement system ("OXTRAN2/20" manufactured by MOCON Inc.).
(Pressure Resistance)

Pressure resistance burst test is carried out for 10 bottles using a pressure resistance test system (KT-5000 manufactured by EVIC Inc.), and the average value of pressure resistance strength is calculated to evaluate the pressure resistance.

(Pressure Resistance Uniformity)

Standard deviation is calculated with respect to the pressure resistance strength obtained from the pressure resistance burst test that was carried out for 10 bottles, and it is evaluated as pressure resistance uniformity.

Example 12

A bottle was prepared in the same manner as Example 11 except that the EVOH composition (A3) obtained in Polymerization Example 1 was used in place of the EVOH composition (A1) and evaluation was similarly carried out.

Example 13

A bottle was prepared in the same manner as Example 11 except that the EVOH composition (A2) obtained in Example 6 was used in place of the EVOH composition (A1) and evaluation was similarly carried out.

Example 14

A bottle was prepared in the same manner as Example 11 except that the EVOH composition obtained by melt-mixing the EVOH composition (A1) and the EVOH composition (B2) at a weight ratio of 30/70 was used in place of the EVOH composition (A1) and evaluation was similarly carried out.

Comparative Example 2

A bottle was prepared in the same manner as Example 11 except that the EVOH composition (B1) was used in place of the EVOH composition (A1) and evaluation was similarly carried out.

Comparative Example 3

A bottle was prepared in the same manner as Example 11 except that the EVOH composition obtained by melt-kneading the EVOH composition (B1) and the EVOH composition (B3) at a weight ratio of 70/30 was used in place of the EVOH composition (A1) and evaluation was similarly carried out.

Comparative Example 4

A bottle was prepared in the same manner as Example 11 except that the EVOH composition obtained by melt-kneading the EVOH composition (B1) and a polyamide resin ["GRILON CF6S" manufactured by EMS Chemie Japan Co.), a copolymer of nylon 6/12, a density of 1.05 g/cm$^3$, a melting point of 133° C. and an MFR of 18 g/10 min (210° C., a load of 2160 g)] at a weight ratio of 90/10 was used in place of the EVOH composition (A1) and evaluation was similarly carried out.

The evaluation results of Examples 11 to 14 and Comparative Examples 2 to 4 are collectively shown in Table 2.

TABLE 2

| | Impact resistance | | | | |
|---|---|---|---|---|---|
| | Delamination property | Transparency | Oxygen transmission rate | Pressure resistance | Pressure resistance uniformity |
| Ex. 11 | ◉ | <0.5 mm | 0.025 cc/day | 39 kg/cm$^2$ | 1.2 |
| Ex. 12 | ◉ | <0.5 mm | 0.025 cc/day | 32 kg/cm$^2$ | 1.7 |
| Ex. 13 | ○ | 1.0 mm | 0.024 cc/day | 33 kg/cm$^2$ | 1.5 |

TABLE 2-continued

| | Impact resistance | | | | |
|---|---|---|---|---|---|
| | Delamination property | Transparency | Oxygen transmission rate | Pressure resistance | Pressure resistance uniformity |
| Ex. 14 | ○ | 1.0 mm | 0.014 cc/day | 37 kg/cm$^2$ | 1.8 |
| Com. Ex. 2 | X | >2.5 mm | 0.029 cc/day | 21 kg/cm$^2$ | 2.6 |
| Com. Ex. 3 | ○ | >2.5 mm | 0.027 cc/day | 22 kg/cm$^2$ | 2.3 |
| Com. Ex. 4 | ◎ | >2.5 mm | 0.025 cc/day | 22 kg/cm$^2$ | 2.3 |

Polymerization Example 2

The EVOH composition (A4) was obtained by the following method.

Into a 1 m$^3$ polymerization reactor having a cooling coil, 500 kg of vinyl acetate, 100 kg of methanol, 500 ppm (based on vinyl acetate) of acetyl peroxide, 20 ppm (based on vinyl acetate) of citric acid and 14 kg of 3,4-diacetoxy-1-butene were charged, the system was replaced once with nitrogen gas and then, replaced with ethylene and ethylene was pressurized to 35 kg/cm$^2$ to be stirred. Temperature was raised to 67° C. and polymerization was carried out for 6 hours until polymerization rate was 50% while adding the total amount of 4.5 kg of 3,4-diacetoxy-1-butene at 15 g/min. Then, the polymerization reaction was stopped to obtain an ethylene-vinyl acetate copolymer with an ethylene content of 29% by mol.

The methanol solution of the ethylene-vinyl acetate copolymer was fed at a speed of 10 kg/hr from the tower top portion of a shelf stage tower (hydrolyzing tower) and methanol solution containing 0.012 equivalent of sodium hydroxide for the residual acetic acid group in the copolymer was simultaneously fed from the tower top portion. On the other hand, methanol was fed at 15 kg/hr from the tower lower portion. Temperature in the tower was 100 to 110° C. and the pressure of the tower was 3 kg/cm$^2$G. The methanol solution (30% of EVOH and 70% of methanol) of EVOH containing a structural unit having 1,2-glycol bond was taken out from 30 minutes after start of the charging. The hydrolysis degree of a vinyl acetate component of EVOH was 99.5% by mol.

Then, the methanol solution of the obtained EVOH was fed at 10 kg/hr from the tower top portion of a methanol/aqueous solution preparation tower, methanol vapor at 120° C. and water vapor were respectively charged at 4 kg/hr and 2.5 kg/hr from the tower lower portion, methanol was distilled off at 8 kg/hr from the tower top portion, and 6 equivalent of methyl acetate based on the amount of sodium hydroxide used in the hydrolysis was simultaneously from the tower middle portion of the tower with a inner tower temperature of 95 to 110° C. to obtain the water/alcohol solution of EVOH (a resin concentration of 35%) from the tower bottom portion.

The water/alcohol solution of EVOH obtained was extruded in a strand shape from a nozzle with a hole diameter of 4 mm in a coagulation solution vessel kept at 5° C. that comprises 5% of methanol and 95% of water and the strand shape article was cut with a cutter after completion of the coagulation to obtain the porous pellets of EVOH with a diameter of 3.8 mm, a length of 4 mm and a moisture content of 45%.

After the porous pellets were rinsed with water so that water was 100 parts based on 100 parts of the porous pellets, they were charged into mix solution containing 0.032% of boric acid and 0.007% of calcium dihydrogen phosphoric acid and the mixture was stirred at 30° C. for 5 hours. The porous pellets were dried for 12 hours by passing nitrogen gas with a moisture content of 0.6% and a temperature of 70° C. in a batch type aeration box drier, the moisture content was reduced to 30%, and then the pellets were dried for 12 hours with nitrogen gas with a moisture content of 0.5% and a temperature of 120° C. using a batch type tower fluidized bed drier to obtain pellets with the objective EVOH composition. The pellets contained boric acid and calcium dihydrogen phosphoric acid by 0.015 part (converted to boron) and 0.005 part (converted to phosphate radical) respectively based on 100 parts of EVOH.

Further, the MFR of the EVOH composition was 4.0 g/10 min (210° C., a load of 2160 g) and the introduction amount of a 1,2-glycol bond was 2.5% by mol.

Polymerization Example 3

The EVOH composition (A5) was obtained by the following method.

EVOH composition (A5), in which the introduction amount of 1,2-glycol bond was 2.0% by mol, an ethylene content was 29% by mol and, boric acid content was 0.015 part (converted to boron), calcium dihydrogen phosphate content was 0.005 part (converted to phosphate radical) and MFR was 3.4 g/10 min, was obtained in the same manner as POLYMERIZATION EXAMPLE 2 except that a mixture (70:20:10) of 3,4-diacetoxy-1-butene, 3-acetoxy-4-ol-1-butene and 1,4-diacetoxy-1-butene was used in place of 3,4-diacetoxy-1-butene.

Polymerization Example 4

The EVOH composition (A6) was obtained by the following method.

EVOH composition (A6), in which the introduction amount of 1,2-glycol bond was 4.5% by mol, an ethylene content was 29% by mol, boric acid content was 0.015 part (converted to boron), calcium dihydrogen phosphate content was 0.005 part (converted to phosphate radical) and MFR was 4.0 g/10 min, was obtained in the same manner as POLYMERIZATION EXAMPLE 2 except that the dropwise addition speed of 3,4-diacetoxy-1-butene was set as 63 g/min and 19 kg was added in total.

Separately, the EVOH composition (B4) not having 1,2-glycol bond in which an ethylene content was 29% by mol, the hydrolysis degree was 99.5% by mol, MFR was 3.5 g/10 min (210° C., a load of 2160 g), boric acid content was 0.015 part (converted to boron) and calcium dihydrogen phosphate content was 0.005 part (converted to phosphate radical) was prepared.

Example 15

The EVOH composition (A4) obtained in Polymerization Example 2, a thermoplastic resin (high density polyethylene "HB214R"; manufactured by Polychem Japan Co., Ltd.) and an adhesive resin (linear low density polyethylene modified with maleic anhydride "M572"; manufactured by Mitsubishi Chemical Corporation) were fed to a 4 species and 6 layers co-extrusion multilayer direct blow system, to obtain a 4 species and 6 layers fuel container (a tank with about 40 litters: an oval hot-water bottle shape with a long diameter of 750 mm, a short diameter of 530 mm and a height of 280 mm) which comprises [outside] high density polyethylene layer/ regrind layer/adhesive resin layer/EVOH composition layer/ adhesive resin layer/high density polyethylene layer [inside]. Further, the thickness of the laminate at the central portion of the container was 5 mm and the compositional thickness ratio of [outside] high density polyethylene layer/regrind layer/ adhesive resin layer/EVOH composition layer/adhesive resin layer/high density polyethylene layer [inside] was 15/45/3/4/

3/30 (the position of EVOH layer was about 33 to 37% from the inside to the outside of a thickness direction). However, the pulverized article of the same fuel container preliminarily molded was used for the regrind layer.

Further, cycle that after the obtained fuel container was left at −40° C. for 1 hour in a heat shock tester "TSA-10OL(A/W)" manufactured by TABAI ESPEC Corp., temperature was raised to 75° C. and left for 1 hour and temperature was lowered to −40° C. was repeated 5 times, then 30 litters of model gasoline (mixing volume ratio of 40/40/10) comprising toluene/isooctane/ethyl alcohol was filled, its orifice was sealed with a metal plate, then the container was left in an environmental test chamber set at 40±2° C., the weight change of the container before and after the standing test was measured and the transmission ratio (g/day) of the model gasoline was calculated to evaluate the barrier property.

The above transmission ratio of the model gasoline for 10 bottles of the fuel container before conducting the heat shock test was measured, and the standard deviation thereof is calculated and it is evaluated as the stability of fuel barrier property. Further, it can be judged that a container having less standard deviation is little in the unevenness of fuel barrier property and stability is good.

Example 16

A fuel container was prepared in the same manner as Example 15 except that the EVOH composition (A5) was used in place of the EVOH composition (A4), and evaluation was similarly carried out.

Example 17

A fuel container was prepared in the same manner as Example 15 except that the EVOH composition (A6) was used in place of the EVOH composition (A4), and evaluation was similarly carried out.

Comparative Example 5

A fuel container was prepared in the same manner as Example 15 except that the EVOH composition (B4) was used in place of the EVOH composition (A4), and evaluation was similarly carried out.

The evaluation results of Examples 15 to 17 and Comparative Example 5 are collectively shown in Table 3.

TABLE 3

|  | Fuel transmission rate (g/day) | Standard deviation of fuel transmission rate |
|---|---|---|
| Ex. 15 | 0.04 | 0.0082 |
| Ex. 16 | 0.04 | 0.0094 |
| Ex. 17 | 0.03 | 0.0074 |
| Com. Ex. 5 | 0.18 | 0.0149 |

Polymerization Example 5

The EVOH composition (A7) was obtained by the following method.

EVOH composition (A7), in which an ethylene content was 29% by mol, the introduction amount of 1,2-glycol bond was 4.5% by mol, boric acid content was 0.015 part by weight (converted to boron), calcium dihydrogen phosphate content was 0.005 part (converted to phosphate radical) and MFR was 4.0 g/10 min, was obtained in the same manner as Polymerization Example 1 except that the charging amount of methanol was set as 100 kg, ethylene pressure was set as 35 kg/cm$^2$, the dropwise addition speed of 3,4-diacetoxy-1-butene was set as 63 g/min and 19 kg was added in total.

Further, separately, the EVOH compositions not having 1,2-glycol bong described below were obtained.

The EVOH composition (B5): an ethylene content was 38% by mol, the hydrolysis degree was 99.5% by mol, MFR was 3.5 g/10 min (210° C., a load of 2160 g), boric acid content was 0.015 part by weight (converted to boron) and calcium dihydrogen phosphate content was 0.005 part by weight (converted to phosphate radical).

The EVOH composition (B6): an ethylene content was 29% by mol, the hydrolysis degree was 99.5% by mol, MFR was 3.1 g/10 min (210° C., a load of 2160 g), boric acid content was 0.015 part by weight (converted to boron) and calcium dihydrogen phosphate content was 0.005 part by weight (converted to phosphate radical).

The EVOH composition (B7): an EVOH composition (boric acid and calcium dihydrogen phosphate are not added) obtained by re-acetification method in which an ethylene content was 47% by mol, the hydrolysis degree was 95.0% by mol and MFR was 20 g/10 min (210° C., a load of 2160 g).

Example 18

A multilayer film with the layer composition (thickness of 100/20/40/20/100 μm) of polyethylene (NOVATEC C6/NOVATEC EVA=70/30% by weight) layer/adhesive resin layer ("MODIC AP M533" manufactured by Mitsubishi Chemical Corporation) layer/modified EVOH layer/adhesive resin layer (same as the left)/polyethylene layer (same as the left) was prepared by feeding the EVOH composition (A1) obtained in Example 5 to a multilayer extrusion system equipped with a multilayer T die with the feed block of 3 species and 5 layers. After the successive biaxial stretching of the multilayer film was carried out to vertically 3.5 times and horizontally 3.5 times at 80° C. by a biaxial stretching machine, the film was cooled by cool air of 20° C. and fixed to obtain the multilayer shrink film of the present invention. The stretching property at preparing the multilayer shrink film, the thermal shrinkage and gas barrier property of the obtained multilayer film, transparency after thermal shrinkage and delamination property were evaluated in the following manner.

(Stretching Property)

The obtained laminate is visually observed and its appearance is evaluated below.

◯ . . . Stretching unevenness and uneven thickness were not confirmed and appearance was good.

Δ . . . Although stretching unevenness and uneven thickness were slightly confirmed and it could be used.

X . . . It was fractured at stretching and a stretch film could not be obtained.

(Thermal Shrinkage)

The multilayer film after stretching was cut out to 10 cm×10 cm and immersed in hot water at 90° C. for 30 seconds, and the shrinkage ratio (%) of area was calculated in the following manner.

Shrinkage ratio (%) of area=$\{(S-s)/S\} \times 100$

S: The area of a film before shrink.
s: The area of a film after shrink.

(Gas Barrier Property)

The oxygen transmission rate of the multilayer film after stretching was measured under the conditions of 23° C. and 80% RH, using "OXTRAN 2/21" manufactured by MOCON Inc.

(Transparency)

The appearance of the multilayer film after thermal shrinkage with hot water was visually observed and evaluated in the following manner.

○ ... Abnormality was not observed in appearance.
Δ ... Opaque portions were partially confirmed.
X ... Opaque portions were confirmed over the whole.

(Delamination Property)

The multilayer film after thermal shrinkage with hot water was massaged with hands at uniform force for one minute and it was visually observed whether delamination was generated in the multilayer film or not.

○ ... Delamination was not confirmed at all.
Δ ... Although delamination was confirmed at the edge portion of the film, it could be used.
X ... Delamination was confirmed at the central portion of the film.

Example 19

A multilayer shrink film was prepared in the same manner as Example 18 except that the EVOH composition (A2) obtained in Example 6 was used in place of the EVOH composition (A1), and evaluation was similarly carried out.

Example 20

A multilayer shrink film was prepared in the same manner as Example 18 except that the EVOH composition (A7) obtained in Polymerization Example 5 was used in place of the EVOH composition (A1), and evaluation was similarly carried out.

Example 21

Evaluation was carried out in the same manner as Example 19 except that a multilayer shrink film with the 4 species and 6 layers (thickness of 100/20/40/40/20/100 μm) of ethylene-vinyl acetate copolymer layer/adhesive resin ("MODIC AP M533" manufactured by Mitsubishi Chemical Corporation) layer/polyamide ("NOVAMIDE" 2030 manufactured by Mitsubishi Chemical Corporation)layer/EVOH composition layer/adhesive resin layer (same as the left)/ethylene-vinyl acetate copolymer layer (same as the left) was prepared by feeding the EVOH composition (A2) to a multilayer extrusion system equipped with a T die with the 4 species and 6 layers.

Comparative Example 6

A multilayer shrink film was prepared in the same manner as Example 18 except that the EVOH composition (B5) was used in place of the EVOH composition (A1), and evaluation was similarly carried out.

Comparative Example 7

A multilayer shrink film was prepared in the same manner as Example 18 except that the EVOH composition (B6) was used in place of the EVOH composition (A1), and evaluation was similarly carried out.

Comparative Example 8

A multilayer shrink film was prepared in the same manner as Example 21 except that the EVOH composition (B5) was used in place of the EVOH composition (A2), and evaluation was similarly carried out.

Comparative Example 9

A multilayer shrink film was prepared in the same manner as Example 18 except that a melt mixture of 70/30 parts by weight of the EVOH composition (B5) and the EVOH composition (B7) was used in place of the EVOH composition (A1), and evaluation was similarly carried out.

The evaluation results of Examples 18 to 21 and Comparative Examples 6 to 9 are collectively shown in Table 4.

TABLE 4

| | Stretching property | Thermal shrinkage (%) | Gas barrier property | Transparency | Delamination resistance |
|---|---|---|---|---|---|
| Ex. 18 | ○ | 80 | 13.3 | ○ | ○ |
| Ex. 19 | ○ | 72 | 12.1 | ○ | ○ |
| Ex. 20 | ○ | 76 | 10.3 | ○ | ○ |
| Ex. 21 | ○ | 63 | 11.4 | ○ | ○ |
| Com. Ex. 6 | Δ | 54 | 14.4 | Δ | ○ |
| Com. Ex. 7 | X | — | — | — | — |
| Com. Ex. 8 | Δ | 54 | 13.5 | Δ | ○ |
| Com. Ex. 9 | ○ | 52 | 13.8 | ○ | X |

Note)
The unit of gas barrier property is $cc/m^2 \cdot day \cdot atm$.

INDUSTRIAL APPLICABILITY

Since EVOH of the present invention contains a specific structural unit having a 1,2-glycol bond, a container and a film having excellent appearance, gas barrier properties and strength can be obtained. The biaxially stretch blow bottle of the present invention containing EVOH of the present invention at an intermediary layer is excellent in impact delamination resistance, transparency, pressure resistance and pressure resistance uniformity, and the fuel container of the present invention having EVOH of the present invention at an intermediary layer is excellent in gas barrier property and exhibits good fuel barrier property even after being subject to rapid temperature change such as heat shock. The multilayer shrink film of the present invention having the EVOH layer of the present invention is excellent in stretching property, thermal shrinkage, gas barrier property, transparency and delamination resistance.

The invention claimed is:

1. An ethylene-vinyl alcohol copolymer comprising the structural unit of formula (1):

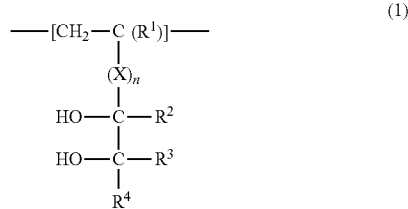

(wherein X represents an alkylene group having at most 6 carbon atoms, each of $R^1$ to $R^4$ represents independently either of a hydrogen atom, a hydrocarbon group having 1 to 8 carbon atoms, a cyclic hydrocarbon group having 3 to 8 carbon atoms or an aromatic hydrocarbon group and n represents 0 or 1);
wherein an ethylene content is 20 to 60% by mol;
wherein an amount of the structural unit of formula (I) is 0.1 to 10% by mol;
wherein a hydrolysis degree is at least 90% by mol; and
wherein a melt flow rate (210° C. and a load of 2160 g) is 0.1 to 100 g/10 minutes.

2. The ethylene-vinyl alcohol copolymer of claim 1, wherein each of $R^1$ to $R^4$ is a hydrogen atom in the structural unit of formula (1).

3. The ethylene-vinyl alcohol copolymer of claim 1, wherein n is 0 in the structural unit of formula (1).

4. The ethylene-vinyl alcohol copolymer of claim 1, characterized in that said ethylene-vinyl alcohol copolymer is obtained by hydrolyzing a copolymer obtained by copolymerization of 3,4-diacyloxy-1-butene, a vinyl ester monomer and ethylene.

5. The ethylene-vinyl alcohol copolymer of claim 4, wherein said 3,4-diacyloxy-1-butene is 3,4-diacetoxy-1-butene.

6. The ethylene-vinyl alcohol copolymer of claim 1, wherein 0.001 to 0.1 part by weight of a boron compound, converted to boron, is contained based on 100 parts by weight of the ethylene-vinyl alcohol copolymer.

7. A molded article comprising the ethylene-vinyl alcohol copolymer of claim 1.

8. The molded article of claim 7, which is obtained by melt-molding.

9. A film comprising the ethylene-vinyl alcohol copolymer of claim 1.

10. A container comprising the ethylene-vinyl alcohol copolymer of claim 1.

11. A biaxially stretched blown bottle comprising an intermediary layer comprising the ethylene-vinyl alcohol copolymer of claim 1, and outer layers presented on respective ones of both sides of the intermediary layer, the outer layers each comprising a thermoplastic polyester resin.

12. A fuel container comprising the ethylene-vinyl alcohol copolymer of claim 1.

13. A multi-layer shrink film comprising a layer comprising the ethylene-vinyl alcohol copolymer of claim 1, and a layer containing thermoplastic resin, which is laminated on one side or both sides of the layer.

14. A process for preparing the ethylene-vinyl alcohol copolymer of claim 1, which comprises the step of preparing a copolymer by copolymerizing 3,4-diacyloxy-1-butene, a vinyl ester monomer and ethylene and a step of hydrolyzing said copolymer.

* * * * *